(12) United States Patent
Kameyama et al.

(10) Patent No.: US 11,134,018 B2
(45) Date of Patent: Sep. 28, 2021

(54) COMMUNICATION DEVICE, COMMUNICATION SYSTEM AND METHOD FOR CONTROLLING COMMUNICATION RATE IN THE COMMUNICATION SYSTEM

(71) Applicant: FUJITSU LIMITED, Kawasaki (JP)

(72) Inventors: Hiroaki Kameyama, Kawasaki (JP); Shinichi Sazawa, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 16/152,461

(22) Filed: Oct. 5, 2018

(65) Prior Publication Data

US 2019/0166053 A1    May 30, 2019

(30) Foreign Application Priority Data

Nov. 30, 2017  (JP) .............................. JP2017-229947

(51) Int. Cl.
*H04L 12/825*  (2013.01)
*H04L 12/28*   (2006.01)
(Continued)

(52) U.S. Cl.
CPC .......... *H04L 47/25* (2013.01); *H04L 12/2854* (2013.01); *H04L 41/0896* (2013.01); *H04L 47/193* (2013.01)

(58) Field of Classification Search
None
See application file for complete search history.

(56) References Cited

U.S. PATENT DOCUMENTS

2004/0242219 A1    12/2004  Oie et al.
2007/0263625 A1*   11/2007  Engstrand ............. H04L 47/822
                                                   370/390
(Continued)

FOREIGN PATENT DOCUMENTS

JP    2002-261765       9/2002
JP    2003-348642 A    12/2003
WO    2014/069642       5/2014

OTHER PUBLICATIONS

Japanese Office Action dated Aug. 10, 2021 for corresponding Japanese Patent Application No. 2017-229947, with English Translation, 6 pages.

*Primary Examiner* — Chi H Pham
*Assistant Examiner* — Raul Rivas
(74) *Attorney, Agent, or Firm* — Fujitsu Patent Center

(57) ABSTRACT

A communication device that is used in a multi-point communication includes: a receiver, a processor and a transmitter. The receiver receives, from a target communication device included among one or more destination communication devices of the communication device, information that indicates a reception bandwidth allocated to a data transmission conducted from the communication device to the target communication device. The processor calculates a transmission bandwidth to be allocated to the data transmission conducted from the communication device to the target communication device according to information relating to the one or more destination communication devices. The transmitter transmits data to the target communication device at a rate that does not exceed an upper limit transmission rate. The upper limit transmission rate is determined according to a smaller one of values of the reception bandwidth and the transmission bandwidth.

15 Claims, 22 Drawing Sheets

(51) Int. Cl.
*H04L 12/801* (2013.01)
*H04L 12/24* (2006.01)

(56) References Cited

U.S. PATENT DOCUMENTS

| | | |
|---|---|---|
| 2015/0036534 A1* | 2/2015 | Oshiba ................ H04L 25/0262 370/253 |
| 2015/0124600 A1* | 5/2015 | Nobauer ............... H04L 47/822 370/230 |
| 2015/0304226 A1 | 10/2015 | Takahashi |
| 2019/0379591 A1* | 12/2019 | Boughzala .............. H04L 45/00 |

* cited by examiner

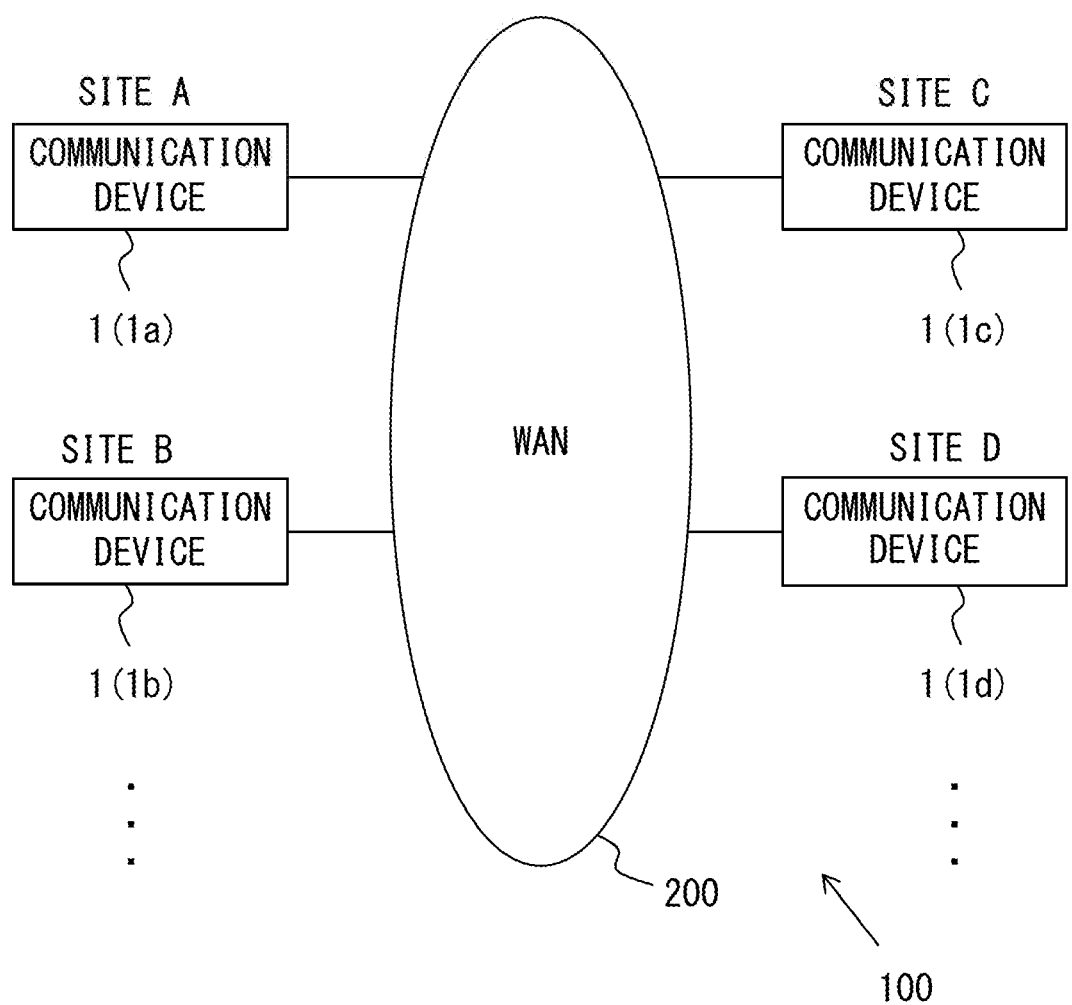
F I G. 1

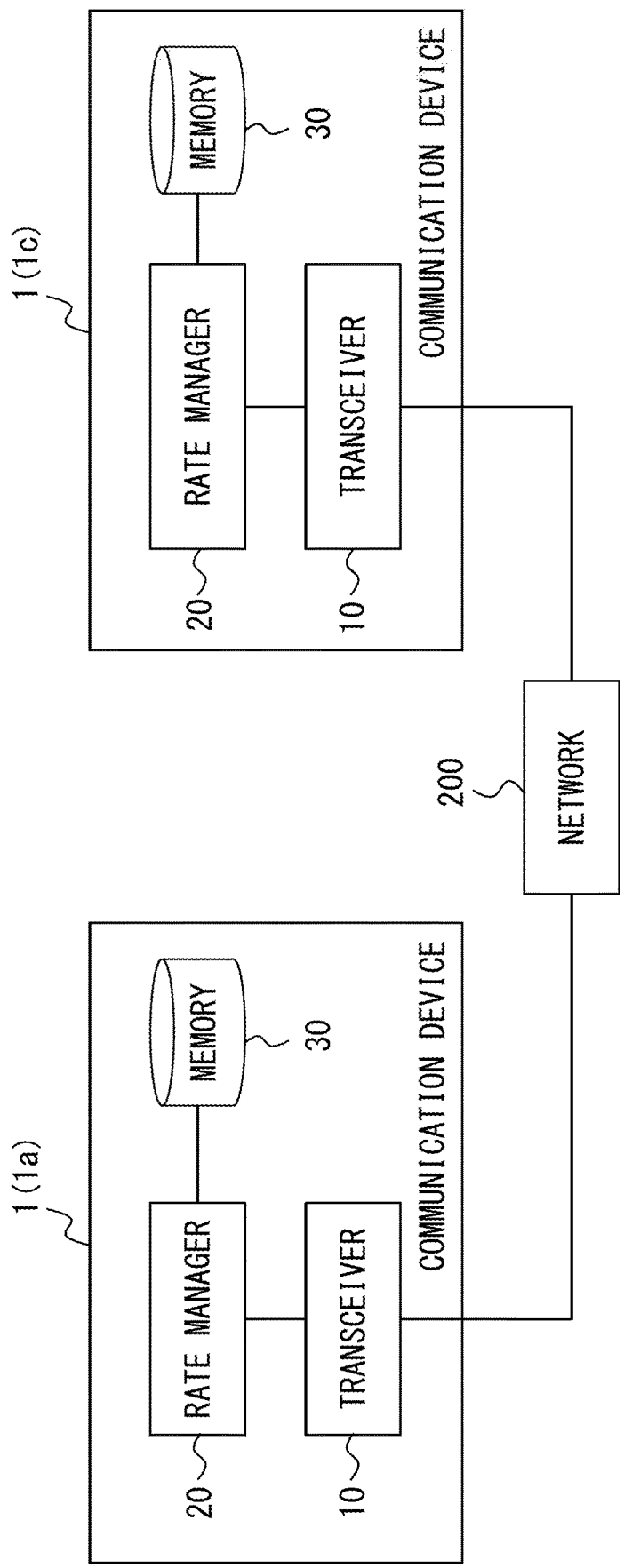
F I G. 7

F I G. 9 A

| SOURCE | RECEPTION RATE | RECEPTION BANDWIDTH(R) |
|---|---|---|
| 1a | 4.5 | 5.0 |
| 1b | 4.0 | 5.0 |
| ... | | |

F I G. 9 B

| DESTINATION | TRANSMISSION RATE | TRANSMISSION BANDWIDTH(T) | RECEPTION BANDWIDTH(R) | UPPER LIMIT TRANSMISSION RATE (V) |
|---|---|---|---|---|
| 1c | 4.5 | 5.0 | 5.0 | 5.0 |
| 1d | 4.3 | 5.0 | 10.0 | 5.0 |
| ... | | | | |

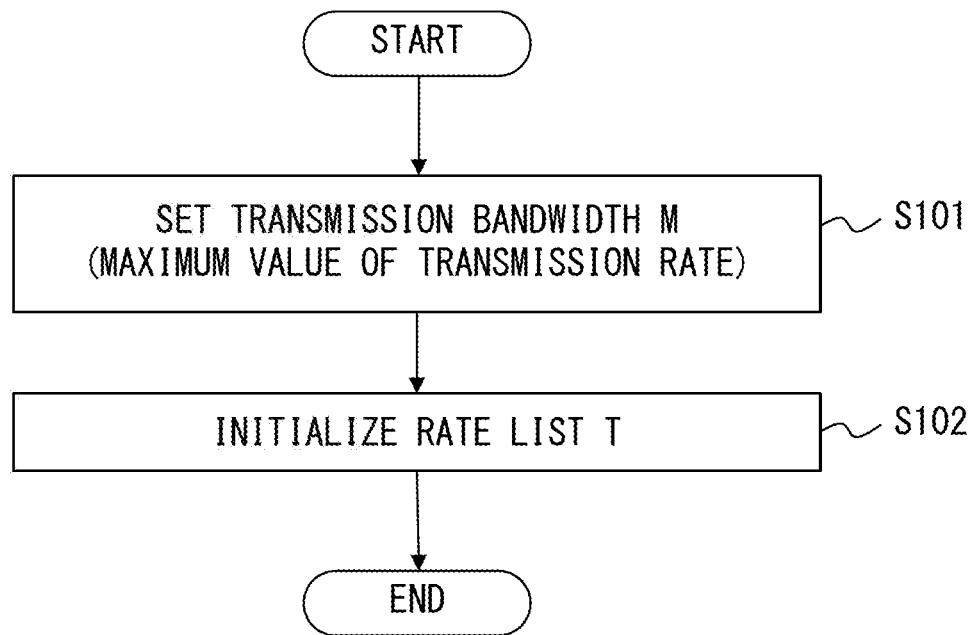
F I G. 1 5

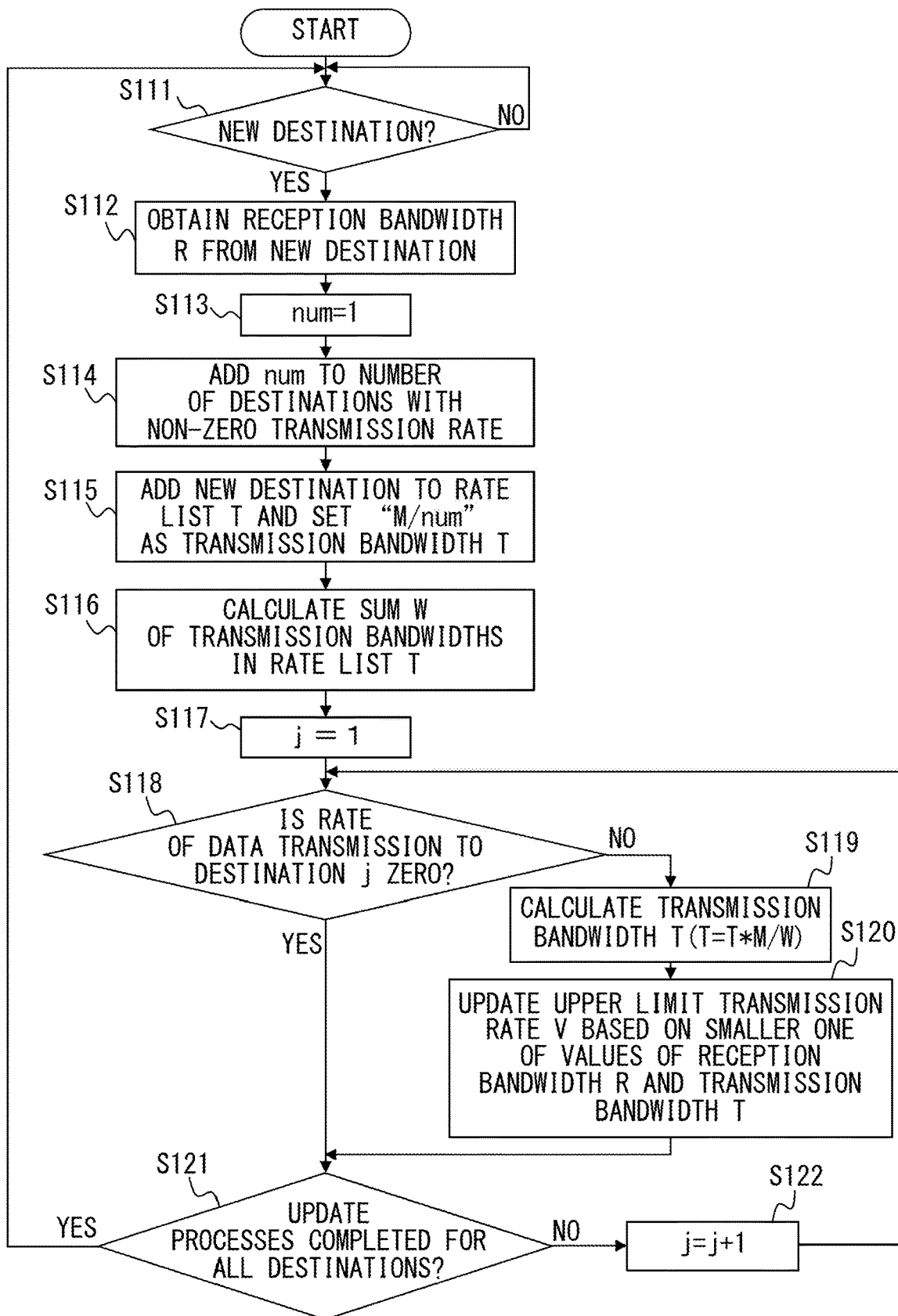
F I G. 1 6

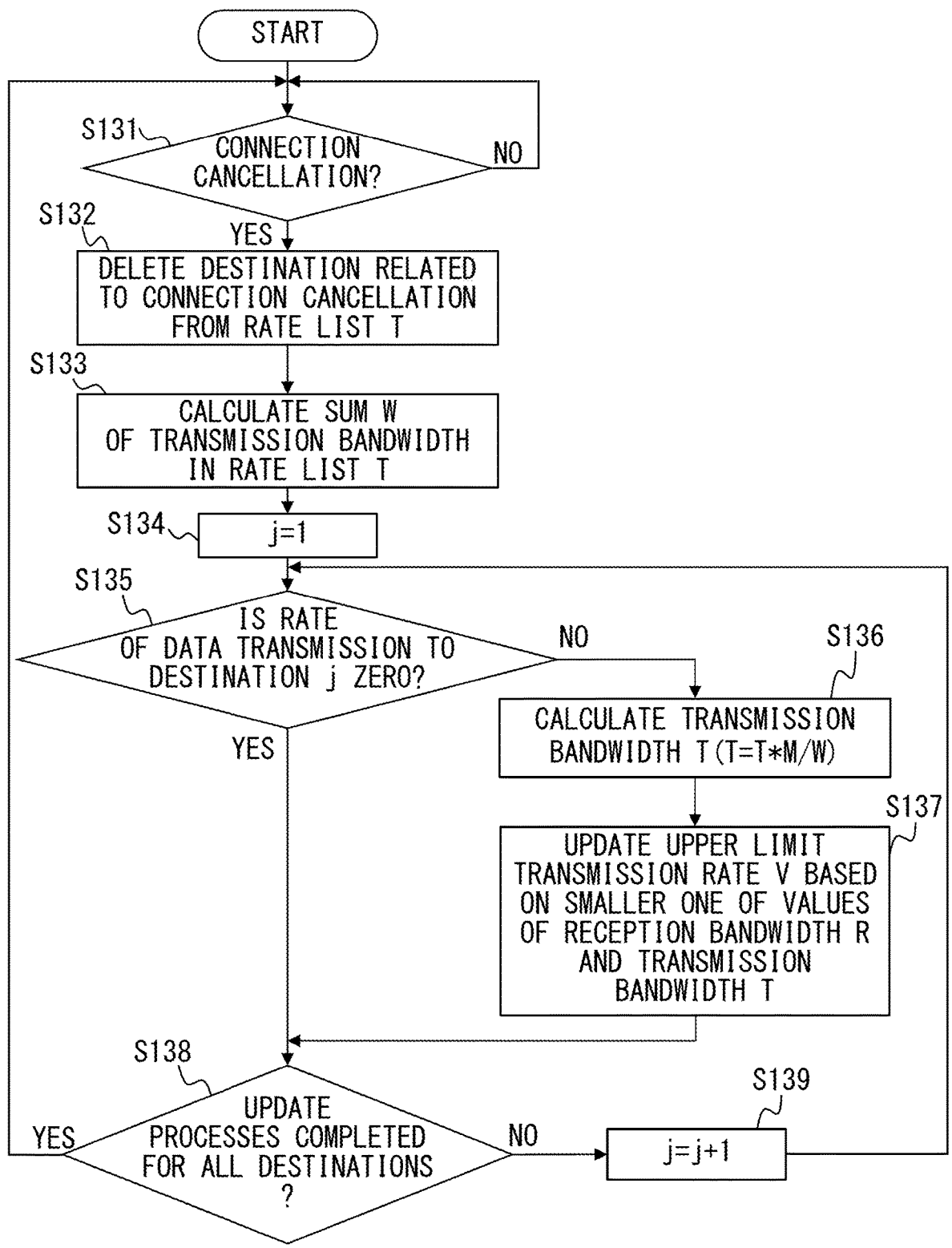
F I G. 1 7

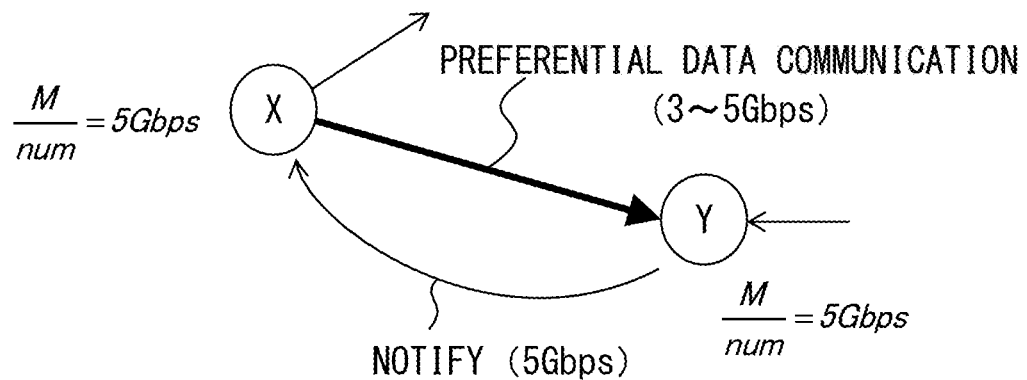
F I G. 2 1 A
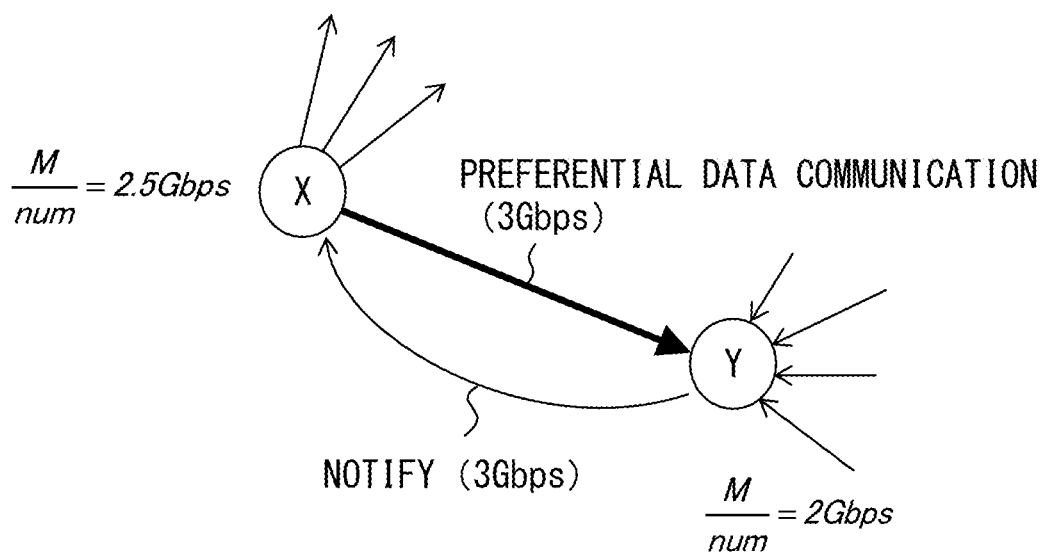
F I G. 2 1 B

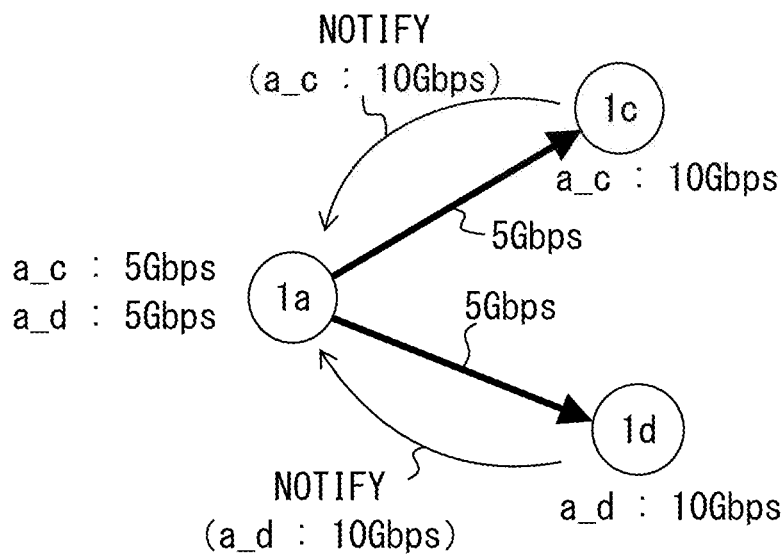
F I G. 2 2 A
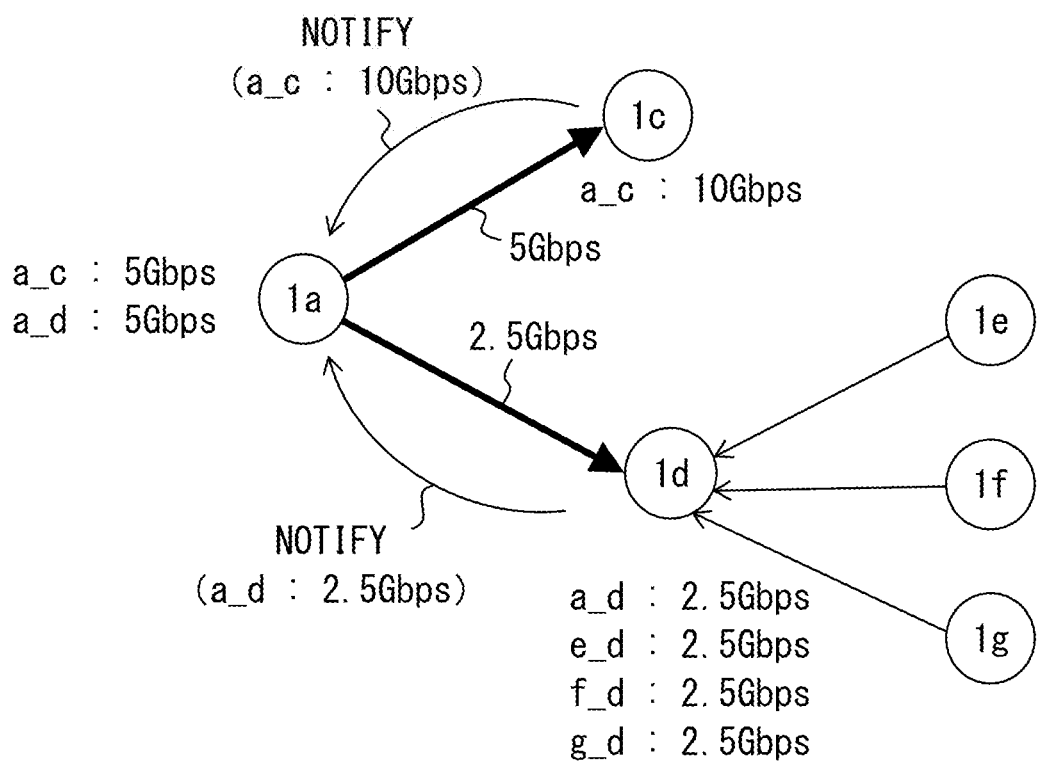
F I G. 2 2 B

COMMUNICATION DEVICE, COMMUNICATION SYSTEM AND METHOD FOR CONTROLLING COMMUNICATION RATE IN THE COMMUNICATION SYSTEM

CROSS-REFERENCE TO RELATED APPLICATION

This application is based upon and claims the benefit of priority of the prior Japanese Patent Application No. 2017-229947, filed on Nov. 30, 2017, the entire contents of which are incorporated herein by reference.

FIELD

The embodiments discussed herein are related to a communication device, a communication system and a method for controlling a communication rate in the communication system.

BACKGROUND

A plurality of users share a circuit in a Wide Area Network (WAN). It is thus desirable that an equitable bandwidth control be conducted so that communication interference will not occur between users.

The Transmission Control Protocol (TCP) has widely spread for wide area networks. The TCP can equally adjust the transmission rate of each user through a congestion control responsive to packet losses and delays. However, the TCP sometimes fails to use communication resources efficiently, and thus transmission rates may decrease. To cope with this problem, a communication scheme that realizes a high-speed communication through efficient use of communication resources (for example the User Datagram Protocol (UDP)) has been put into practice. A UDP-based protocol enables the adjustment of a transmission rate based on for example a measurement of an unoccupied bandwidth.

The technique has been proposed that increases the throughput during a congestion-avoiding operation in a communication session while taking the congestion state of the network into consideration (WO2014/069642 for example). A network bandwidth control has also been proposed that conducts a bandwidth control by transmitting and receiving data in an available bandwidth (Japanese Laid-open Patent Publication No. 2002-261765 for example).

When a communication device communicates with a plurality of communication devices via a wide area network, appropriate allocation of a bandwidth to the plurality of communication devices prevents congestion. Unfortunately, it is difficult for a communication device to detect how many other communication devices the correspondent communication device is communicating with. This prevents an appropriate control of the transmission rate of each user, causing congestion in some cases. In other words, an attempt to avoid congestion in a multi-point communication sometimes results in lower efficiency of a data transmission.

A device dedicated to managing the entire network would solve this problem. However, a configuration in which a dedicated management device manages the data transmission rate of each communication device is costly due to the construction of the system.

SUMMARY

According to an aspect of the present invention, a communication device that is used in a multi-point communication includes: a receiver configured to receive, from a target communication device included among one or more destination communication devices of the communication device, information that indicates a reception bandwidth allocated to a data transmission conducted from the communication device to the target communication device; a processor configured to calculate a transmission bandwidth to be allocated to the data transmission conducted from the communication device to the target communication device according to information relating to the one or more destination communication devices; and a transmitter configured to transmit data to the target communication device at a rate that does not exceed an upper limit transmission rate, the upper limit transmission rate being determined according to a smaller one of values of the reception bandwidth and the transmission bandwidth.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system;

FIG. 7 is a block diagram illustrating the schematic functions of a communication device;

FIG. 9A illustrates an example of a rate list belonging to a receiving communication device;

FIG. 9B illustrates an example of a rate list belonging to a transmitting communication device;

FIG. 15 is a flowchart illustrating an example of the initial setting for a source communication device;

FIG. 16 is a flowchart illustrating an example of a process that a source communication device performs when it is connected to a new destination communication device;

FIG. 17 is a flowchart illustrating an example of a process that a source communication device performs when the connection to a destination communication device is canceled;

FIGS. 21A and 21B illustrate examples of a preferential data transmission;

FIGS. 22A and 22B illustrate examples of a method for controlling a communication rate.

DESCRIPTION OF EMBODIMENTS

FIG. 1 illustrates an example of a communication system according to an embodiment of the present invention. A communication system 100 according to the present embodiment includes a plurality of communication devices 1 (1a through 1d). The communication devices 1a through 1d are located at different sites from each other. The communication devices 1a, 1b, 1c, and 1d are located respectively at sites A, B, C, and D in this example. Also, the communication devices 1a through 1d are connected to the others via a network. The communication devices 1a through 1d are connected to a Wide Area Network (WAN) 200 in this example.

Each of the communication devices 1a through 1d can transmit data to a desired communication device 1. Each of the communication devices 1a through 1d can also receive data from a desired communication device 1.

However, each of the communication devices 1a through 1d transmits data to its destination at a rate that does not exceed a specified upper limit rate. An upper limit rate is determined for example for each destination. Also, the communication devices 1a through 1d each may determine the upper limit rate in accordance with notification from a receiving communication device 1.

Figure 2:
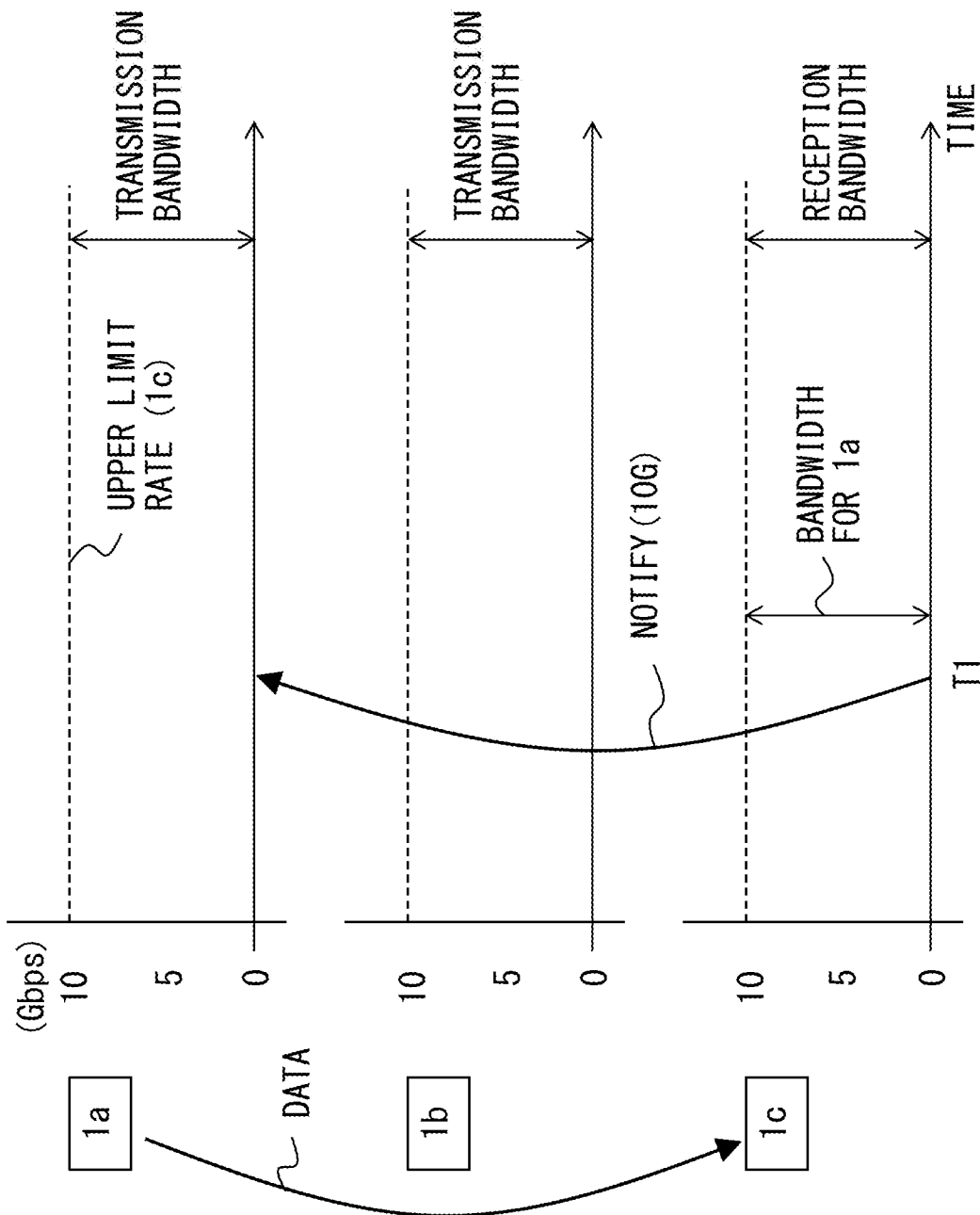
FIGS. 2-6 illustrate examples of a method for adjusting an upper limit transmission rate.

FIG. 2 illustrates an example of a method for adjusting an upper limit transmission rate. Each communication device 1 has a transmission bandwidth of 10 Gbps in this example. A transmission bandwidth is equivalent to a maximum transmission rate, and is a fixed value. Each communication device 1 determines the upper limit transmission rate for each destination in such a manner that the sum of the transmission rates for respective destinations does not exceed the maximum transmission rate. Each communication device 1 has a reception bandwidth of 10 Gbps. A reception bandwidth is equivalent to a maximum reception rate, and is a fixed value.

It is assumed in the example of FIG. 2 that the communication devices 1a, 1b, and 1c do not transmit data between them before time T1. At time T1, the communication device 1a makes a request for a data transmission to the communication device 1c.

The communication device 1c calculates a bandwidth to be allocated to each source communication device according to the reception bandwidth (i.e., the maximum reception rate for the communication device 1c) and the number of the source communication devices (i.e., the communication devices that transmit data to the communication device 1c). For example, the communication device 1c divides the reception bandwidth by the number of the source communication devices so as to calculate the reception bandwidth to be allocated to each source communication device. In the example illustrated in FIG. 2, the communication device 1c has a reception bandwidth of 10 Gbps, and the number of the source communication devices is "1". Thus, the reception bandwidth to be allocated to the communication device 1a is 10 Gbps. Note that the reception bandwidth allocated to each source communication device is equivalent to the upper limit rate for a data transmission from that source communication device to the communication device 1c.

The communication device 1c notifies each source communication device of the calculated reception bandwidth. Specifically, the communication device 1c notifies the communication device 1a of "reception bandwidth (1a_1c): 10 Gbps".

The communication device 1a calculates the transmission bandwidth for each data destination. The communication device 1a in this example transmits data to one destination (that is, the communication device 1c). In such a case, the entire transmission bandwidth of the communication device 1a is allocated to the data transmission to the communication device 1c. Thus, a transmission bandwidth of 10 Gbps is allocated to the data transmission to the communication device 1c.

The communication device 1a transmits data to the communication device 1c based on the transmission bandwidth allocated to the communication device 1c and the reception bandwidth notified by the communication device 1c. Specifically, the communication device 1a determines the upper limit transmission rate that corresponds to the smaller one of the values of the transmission bandwidth allocated to the communication device 1c and the reception bandwidth notified by the communication device 1c. The communication device 1a then transmits data to the communication device 1c at a rate that does not exceed the determined upper limit transmission rate.

In the example of FIG. 2, the transmission bandwidth allocated to the communication device 1c and the reception bandwidth (1a_1c) notified to the communication device 1a by the communication device 1c are both 10 Gbps. In this case, the upper limit transmission rate is 10 Gbps. Therefore, the communication device 1a transmits data to the communication device 1c without exceeding 10 Gbps.

As described above, the source communication device is notified of the reception bandwidth calculated by the receiving communication device, and controls its data transmission such that the transmission rate will not exceed the notified reception bandwidth in the communication system 100. This prevents or suppresses congestion without using a central management device such as for example a network management system (NMS), which manages the entire network. Further, each communication device 1 can determine the upper limit transmission rate for preventing or suppressing congestion without measuring the unoccupied bandwidth of the network.

Figure 3:
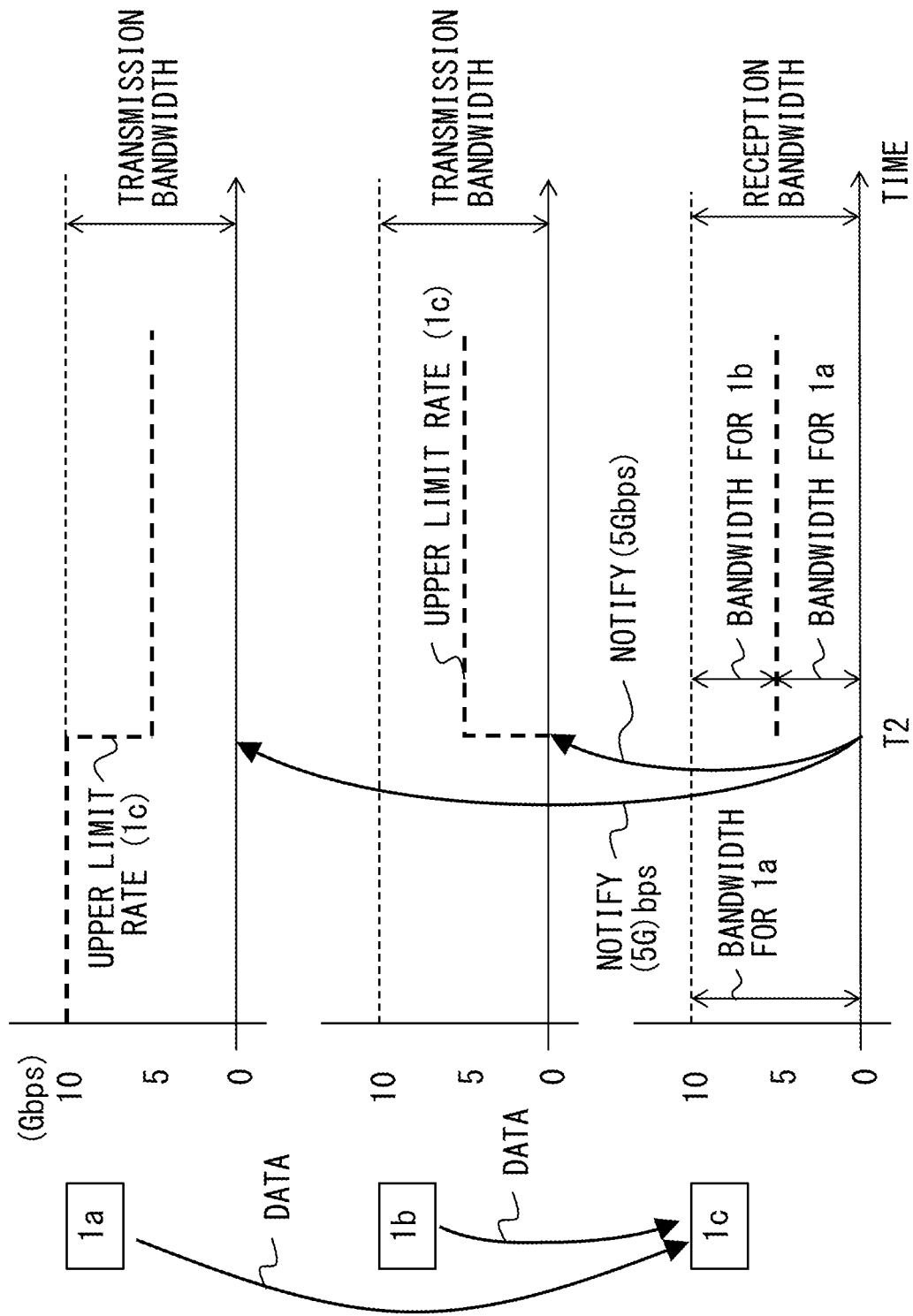

In the example of FIG. 3, data is transmitted from the communication device 1a to the communication device 1c before time T2. This means that the state before time T2 in FIG. 3 is identical to the state after time T1 in FIG. 2. It is assumed in this situation that the communication device 1a transmits data only to the communication device 1c, and the communication device 1c receives data only from the communication device 1a. The upper limit rate for the data transmission to the communication device 1c from the communication device 1a is 10 Gbps. In other words, the communication device 1a controls its data transmission to the communication device 1c such that the transmission rate will not exceed 10 Gbps.

At time T2, the communication device 1b makes a request for a data transmission to the communication device 1c. The communication device 1c then calculates reception bandwidths to be allocated to the source communication devices (1a and 1b). The reception bandwidths to be allocated to the source communication devices can be obtained by dividing the reception bandwidth of the communication device 1c by the number of the source communication devices. The number of the source communication devices is "2" in this example. Also, the reception bandwidth of the communication device 1c is 10 Gbps as described above. Accordingly, a reception bandwidth of 5 Gbps is to be allocated to each of the communication devices 1a and 1b.

The communication device 1c notifies the calculated reception bandwidths to the corresponding source communication devices. Specifically, the communication device 1c notifies the communication device 1a of "reception bandwidth (1a_1c): 5 Gbps" and also notifies the communication device 1b of "reception bandwidth (1b_1c): 5 Gbps".

The communication device 1a transmits data to the communication device 1c based on the transmission bandwidth allocated to the communication device 1c and the reception bandwidth notified by the communication device 1c. That is, the communication device 1a determines the upper limit transmission rate that corresponds to the smaller one of the values of the transmission bandwidth allocated to the communication device 1c and the reception bandwidth notified by the communication device 1c. In the example of FIG. 3, the transmission bandwidth allocated to the communication device 1c is 10 Gbps, and the reception bandwidth notified by the communication device 1c is 5 Gbps. Therefore, an upper limit transmission rate of "5 Gbps" is obtained in the communication device 1a so that the communication device 1a transmits data to the communication device 1c without exceeding 5 Gbps. The communication device 1b similarly transmits data to the communication device 1c without exceeding 5 Gbps.

As described above, an increase in the number of source communication devices that transmit data to the communication device 1c decreases the reception bandwidth that is allocated by the communication device 1c to each source communication device in the communication system 100. Each source communication device transmits data to the communication device 1c within a bandwidth allocated by the communication device 1c. Thus, congestion in the receiving communication device is prevented or suppressed even when the number of source communication devices increases. This enables the prevention or suppression of congestion without conducting complicated bandwidth control in a multi-point communication.

Figure 4:
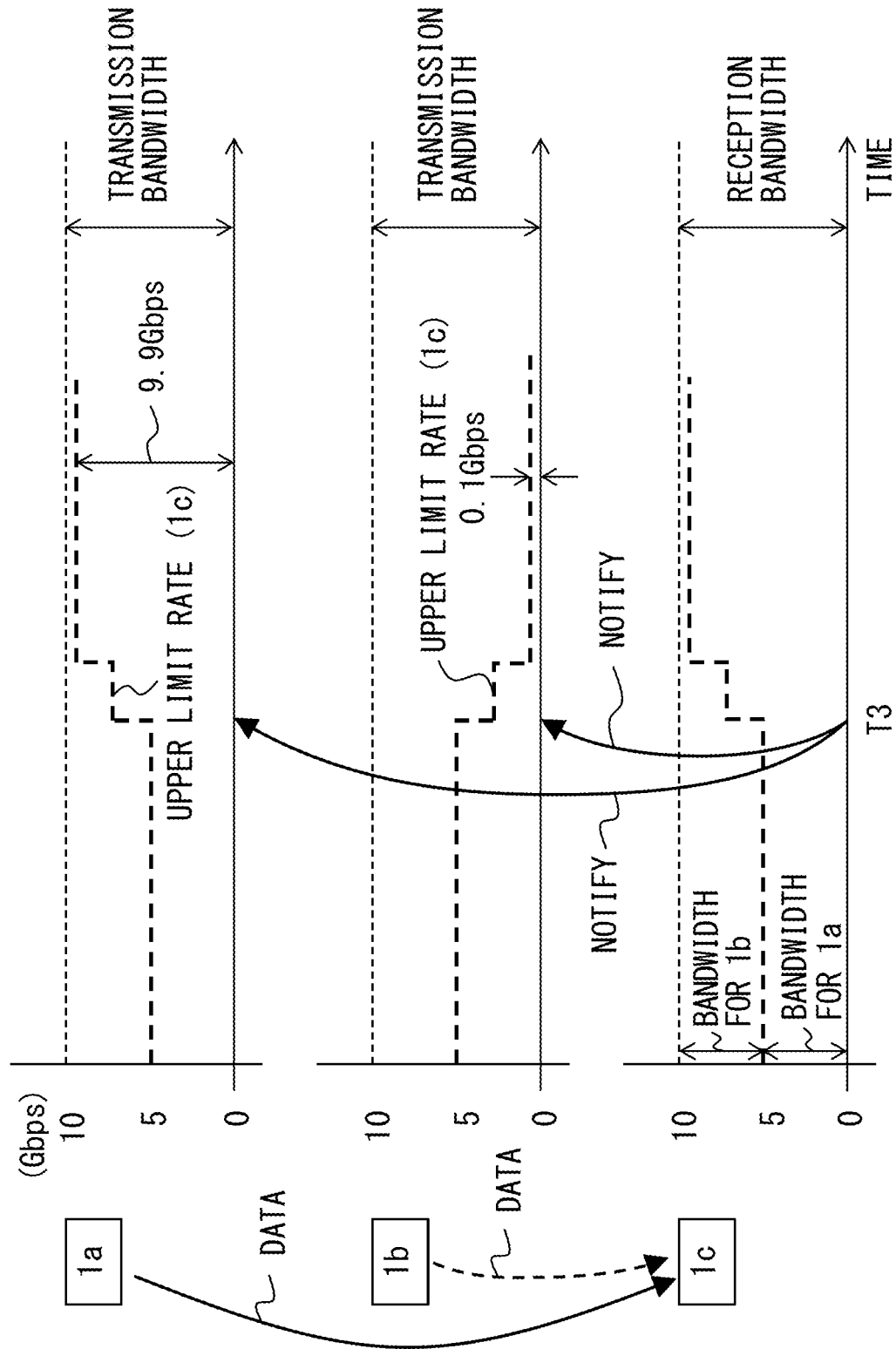

In the example of FIG. 4, data is transmitted respectively from the communication devices 1a and 1b to the communication device 1c before time T3. This means that the state before time T3 in FIG. 4 is identical to the state after time T2 in FIG. 3. Accordingly, the communication device 1a before time T3 transmits data to the communication device 1c at a rate that does not exceed 5 Gbps, and the communication device 1b before time T3 also transmits data to the communication device 1c at a rate that does not exceed 5 Gbps. It is assumed that the communication device 1c is receiving data only from the communication devices 1a and 1b.

At time T3, the communication device 1b stops its data transmission to the communication device 1c. At that moment, the communication device 1c is monitoring the rates of data received from respective communication devices. Therefore, the communication device 1c detects that the communication device 1b has stopped the data transmission to the communication device 1c.

The communication device 1c then performs a bandwidth control in which the bandwidth that was allocated to the communication device 1b before time T3 is allocated to the communication device 1a. In other words, the communication device 1c increases the bandwidth to be allocated to the communication device 1a and decreases the bandwidth to be allocated to the communication device 1b. In this process, the communication device 1c may gradually or stepwisely change the bandwidth to be allocated to each source communication device as illustrated in FIG. 4. The communication device 1c thereafter notifies the newly determined reception bandwidths to the corresponding communication devices 1a and 1b.

The communication devices 1a and 1b respectively adjust their upper limit transmission rates based on the reception bandwidths that are newly notified by the communication device 1c. As a result, the upper limit rate for the data transmission from the communication device 1a to the communication device 1c increases while the upper limit rate for the data transmission from the communication device 1b to the communication device 1c decreases.

However, setting zero as the upper limit rate for the data transmission from the communication device 1b to the communication device 1c may lead to the need for a specified sequence to restart a communication between the communication device 1b and the communication device 1c. To avoid such a case, the communication device 1c does not set zero as the bandwidth to be allocated to the communication device 1b in a case where the data transmission from the communication device 1b to the communication device 1c has stopped but the connection between the two communication devices is maintained. In other words, the communication device 1c provides a bandwidth of the communication device 1b that allows the transmission of a specified minimum amount of information. In the example of FIG. 4, 0.1 Gbps is allocated to the communication device 1b even after the communication device 1b stops the data transmission. The communication device 1a is notified of the remaining bandwidth (9.9 Gbps in this example).

As described above, the stop of the data transmission from a communication device increases the upper limit transmission rate for other different communication devices in the communication system 100. This promotes the efficiency in data transmissions in a multi-point communication.

Figure 5:
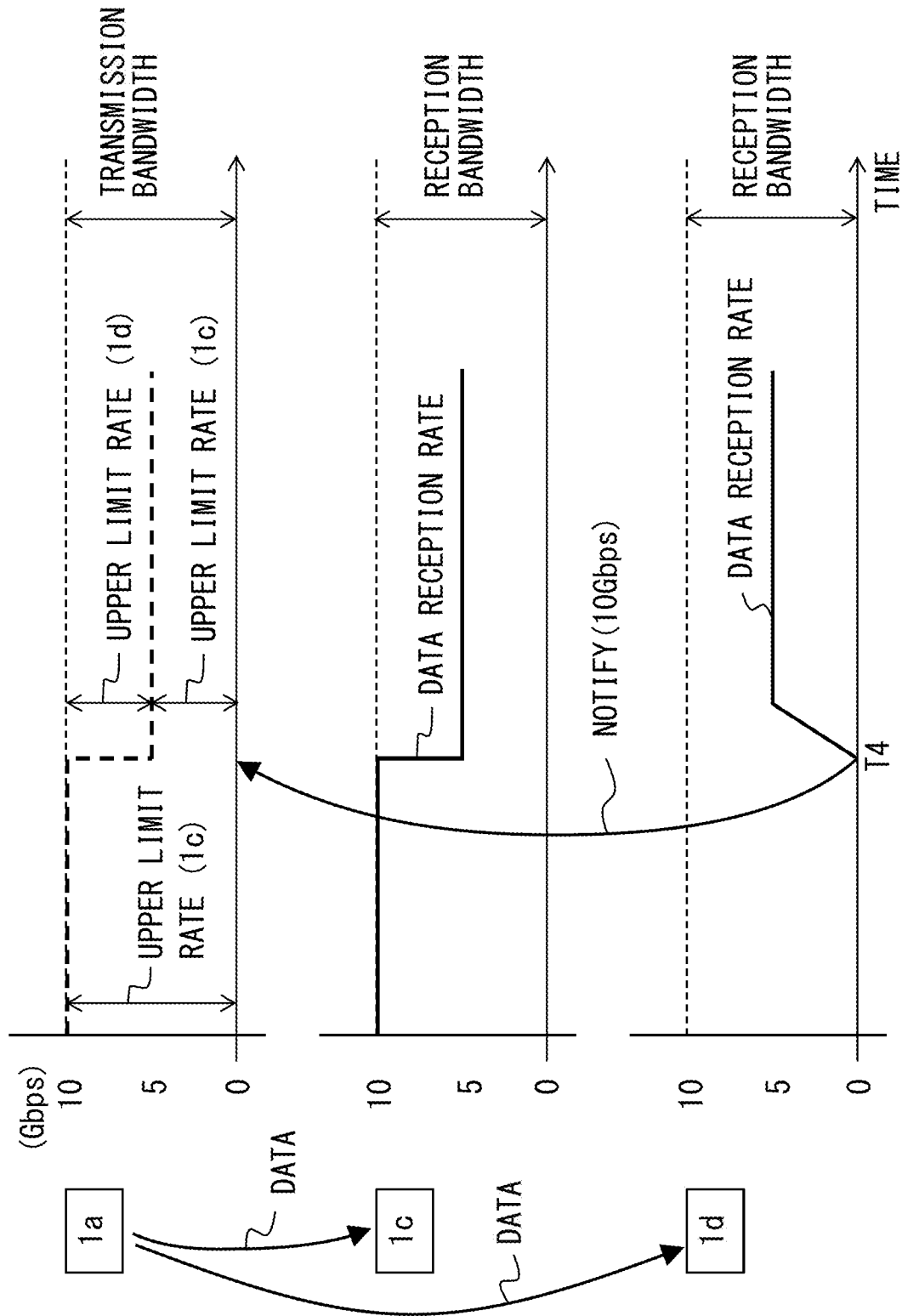

In the example of FIG. 5, data is transmitted from the communication device 1a to the communication device 1c before time T4. It is assumed in this situation that the communication device 1a is transmitting data only to the communication device 1c, and the communication device 1c is receiving data only from the communication device 1a. Therefore, the data transmission from the communication device 1a to the communication device 1c is controlled such that it will not exceed 10 Gbps.

At time T4, the communication device 1a starts a data transmission to the communication device 1d while continuing the data transmission to the communication device 1c. Then, the communication device 1d determines a bandwidth that is to be allocated to the communication device 1a. It is assumed in this example that the reception bandwidth of the communication device 1d has not been allocated to any communication device before time T4. In that case, the communication device 1d can allocate the entire reception bandwidth to the communication device 1a, and thus a bandwidth of 10 Gbps is allocated to the data transmission from the communication device 1a to the communication device 1d. The communication device 1d then notifies the determined reception bandwidth to the communication devices 1a.

The communication device 1a determines transmission bandwidths that are to be allocated respectively to the data transmissions to the communication devices 1c and 1d. In this example, the communication device 1a allocates identical bandwidths to the destination communication devices. Accordingly, a transmission bandwidth of 5 Gbps is allocated to each of the destination communication devices.

A reception bandwidth of 10 Gbps is notified by the communication device 1d to the communication device 1a. The communication device 1a determines an upper limit transmission rate according to the smaller one of the values of the transmission bandwidth allocated to the communication device 1d and the reception bandwidth notified by the communication device 1d. Accordingly, an upper limit rate of 5 Gbps is set for the data transmission from the communication device 1a to the communication device 1d. The upper limit rate for the data transmission from the communication device 1a to the communication device 1c is similarly 5 Gbps.

The communication device 1a transmits data based on the upper limit transmission rate determined as above. Specifically, the communication device 1a controls the data transmission to the communication device 1c such that the transmission rate will not exceed 5 Gbps, and controls the data transmission to the communication device 1d such that the transmission rate will not exceed 5 Gbps.

As described above, when a data transmission to a new destination device starts, that new destination device notifies the source communication device of the reception bandwidth in the communication system 100. The source communication device then controls the data transmission based on the notified reception bandwidth. This prevents or suppresses congestion in a receiving communication device.

Figure 6:
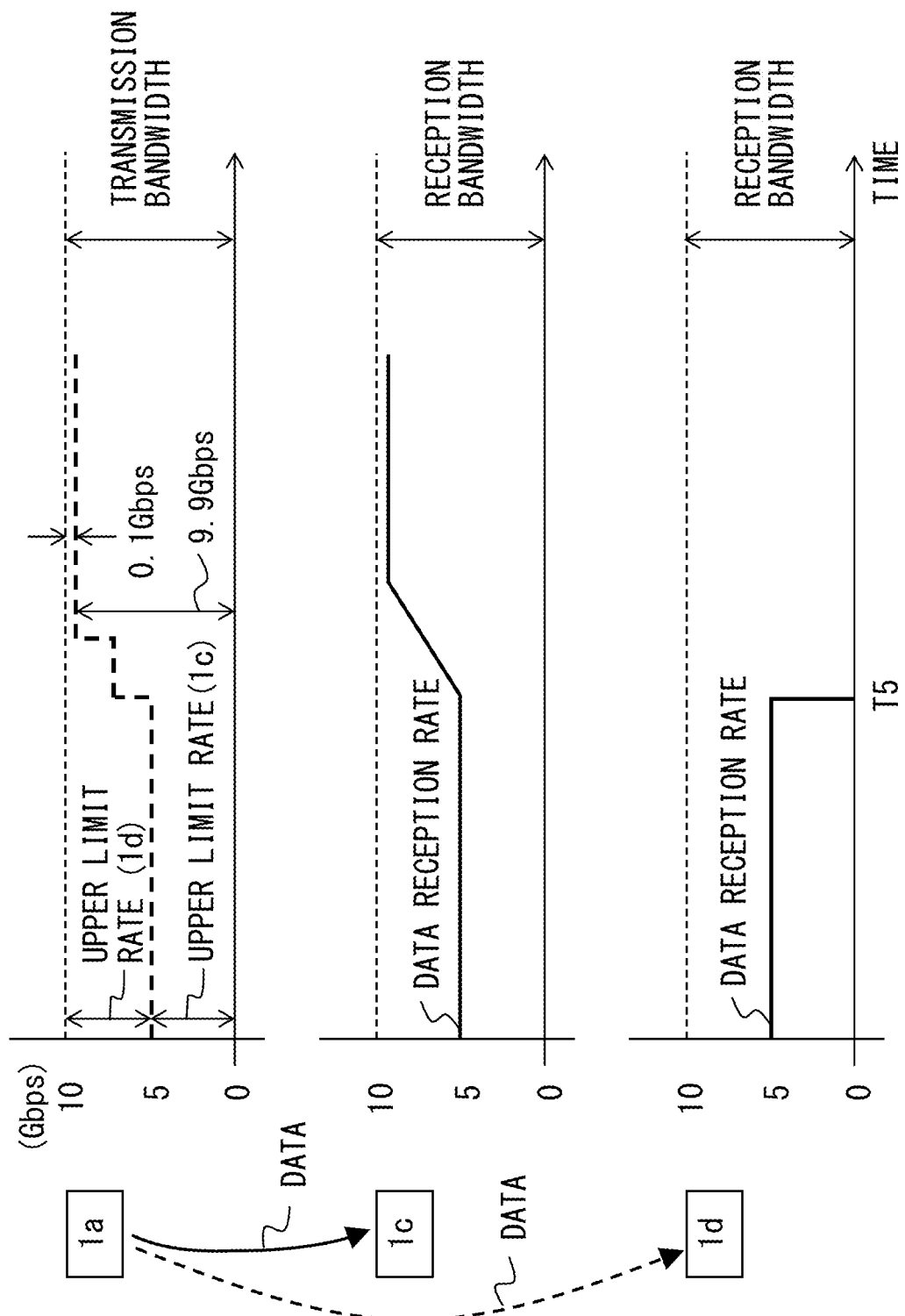

In the example of FIG. 6, the communication device 1a transmits data to the communication devices 1c and 1d before time T5. The state before time T5 in FIG. 6 is identical to the state after time T4 in FIG. 5. In other words, the communication device 1a before time T5 transmits data to the communication device 1c at a rate that does not exceed 5 Gbps, and also transmits data to the communication device 1d at a rate that does not exceed 5 Gbps.

At time T5, the communication device 1a stops its data transmission to the communication device 1d. Then, the communication device 1a decreases the upper limit rate for the data transmission to the communication device 1d, and increases the upper limit rate for data transmissions to the other data transmissions. In this example, the communication device 1a increases the upper limit rate for the data transmission to the communication device 1c. In this process, the communication device 1a may gradually change the upper limit rate for the data transmission to the communication device 1c as illustrated in FIG. 6.

However, setting zero as the upper limit rate for the data transmission from the communication device 1a to the communication device 1d may lead to the need for a specified sequence to restart a communication between the communication device 1a and the communication device 1d. To avoid such a case, the communication device 1a does not set zero as the upper limit rate for the data transmission to the communication device 1d in a case where the data transmission from the communication device 1a to the communication device 1d has stopped but the connection between the two communication devices is maintained. In other words, the communication device 1a sets a rate that allows the transmission of a specified minimum amount of information as the upper limit rate for the data transmission to the communication device 1d. In the example of FIG. 6, an upper limit rate of 0.1 Gbps is set for the communication device 1d.

The upper limit rate corresponding to the remaining bandwidth (9.9 Gbps in this example) is set for the communication device 1c. However, this upper limit rate is determined such that the transmission rate will not exceed the reception bandwidth notified by the receiving communication device. In the examples of FIG. 5 and FIG. 6, the communication device 1c notified the communication device 1a of "reception bandwidth (1a_1c): 10 Gbps" at time T4. Accordingly, the communication device 1a can set 9.9 Gbps as the upper limit rate for the data transmission to the communication device 1c.

As described above, the stop of the data transmission to a communication device increases the upper limit transmission rate for other communication devices in the communication system 100. This promotes the efficiency in data transmissions in a multi-point communication.

FIG. 7 is a block diagram schematically illustrating the functions of the communication devices 1. In the example of FIG. 7, the communication devices 1 (1a and 1c) are connected to the network 200.

Each of the communication devices 1 includes a transceiver 10, a rate manager 20, and a memory 30. The transceiver 10 transmits data to a destination node under the control of the rate manager 20. The transceiver 10 also receives data from other communication devices. The rate manager 20 can determine the upper limit rate for a data transmission. To determine the upper limit rate for a data transmission, the rate manager 20 refers to rate management information stored in the memory 30. The transceiver 10 transmits data to a destination node at a rate that does not exceed the upper limit rate determined by the rate manager 20. The communication devices 1 may have functions that are not illustrated in FIG. 7.

Figure 8:
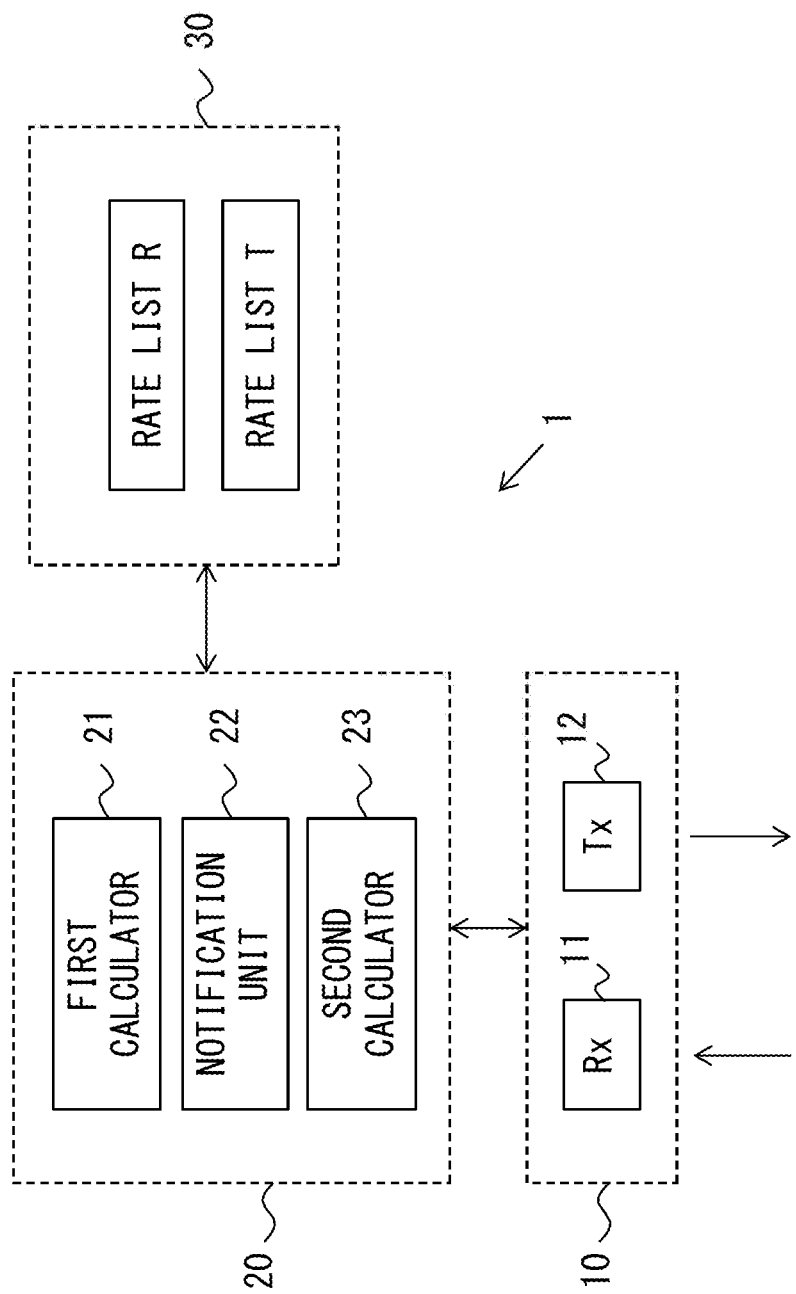
FIG. 8 illustrates an example of the functions of the communication device.

FIG. 8 illustrates an example of the functions of the communication device 1. In this example, the transceiver 10 includes a receiver 11 and a transmitter 12. The rate manager 20 includes a first calculator 21, a notification unit 22, and a second calculator 23. The memory 30 stores rate list R and rate list T.

It is assumed in the descriptions below that data is transmitted from the communication device 1a to the communication device 1c. In other words, the communication device 1a serves as a source communication device and the communication device 1c serves as a destination communication device.

When receiving data from a different communication device, the communication device 1c activates the first calculator 21 and the notification unit 22. In the communication device 1c, the first calculator 21 calculates a first bandwidth that indicates a bandwidth to be allocated to the data transmission from the source communication device to the communication device 1c according to information relating to the source communication device. The information relating to the source communication device may indicate a state of the source communication device. For example, the first calculator 21 calculates the first bandwidth according to the number of the source communication devices. The first calculator 21 may calculate the first bandwidth based on a rate of data received from the source communication device. Alternatively, the first calculator 21 may calculate the first bandwidth by referring to rate list R stored in the memory 30.

FIG. 9A illustrates an example of rate list R. Rate list R is generated, in the communication device 1 that receives data, to manage rates of data received from source communication devices and bandwidths allocated to source communication devices.

Rate list R records a reception rate and a reception bandwidth for each source communication device. The reception rate indicates the rate of data received from the source communication device. The communication device 1 periodically monitors the rate of data received from each source communication device. Therefore, the reception rate recorded in rate list R is updated periodically. The reception bandwidth indicates the bandwidth allocated to the source communication device, and is equivalent to the first bandwidth calculated by the first calculator 21.

The notification unit 22 notifies the source communication device of the first bandwidth (i.e., the upper limit rate) calculated by the first calculator 21. In the example of FIG. 9A, the notification unit 22 notifies the communication device 1a of the reception bandwidth (5.0 Gbps) allocated to the data transmission from the communication device 1a to the communication device 1c and also notifies the communication device 1b of the reception bandwidth (5.0 Gbps) allocated to the data transmission from the communication device 1b to the communication device 1c.

When transmitting data to a different communication device, the communication device 1a activates the second calculator 23. In the communication device 1a, the second calculator 23 calculates a second bandwidth that indicates a transmission bandwidth to be allocated to the data transmission from the communication device 1a to the destination communication device according to information relating to the destination communication device. The information relating to the destination communication device may indicate a state of the destination communication device. For example, the second calculator 23 calculates the transmission bandwidth to be allocated to the data transmission to each destination communication device according to for example the number of the destination communication devices. The second calculator 23 may calculate the transmission bandwidth to be allocated to the data transmission to each destination communication device based on the rate of data to be transmitted to that destination communication device. The transmitter 12 in the communication device 1a transmits data to the destination communication device at a rate that does not exceed the upper limit transmission rate determined based on the first bandwidth (i.e., the reception bandwidth notified by the destination communication device) and the second bandwidth (i.e., the transmission bandwidth calculated by the second calculator 23 in the communication device 1a).

The second calculator 23 determines the upper limit transmission rate based on the first bandwidth and the second bandwidth. The upper limit transmission rate is determined based on for example the smaller one of the values of the first bandwidth and the second bandwidth. In such a case, the communication device 1a transmits data to the destination communication device at a rate that does not exceed the upper limit transmission rate determined based on the first bandwidth and the second bandwidth. The second calculator 23 may calculate the upper limit transmission rate by referring to rate list T stored in the memory 30.

FIG. 9B illustrates an example of rate list T. Rate list T is generated for managing an upper limit transmission rate for each destination communication device in the communication device 1 that transmits data. Rate list T records a transmission rate, a transmission bandwidth, a reception bandwidth, and an upper limit transmission rate for each destination communication device. The transmission rate indicates the rate of data to be transmitted to the destination communication device. The transmission bandwidth indicates the bandwidth allocated to the data transmission to the destination communication device, and is equivalent to the second bandwidth calculated by the second calculator 23. The reception bandwidth indicates the reception bandwidth that is notified by the destination communication device. The upper limit transmission rate is determined based on the transmission bandwidth calculated by the second calculator 23 and the reception bandwidth notified by the destination communication device. Rate list T records, as the upper limit transmission rate, for example the smaller one of the values of the transmission bandwidth calculated by the second calculator 23 and the reception bandwidth notified by the destination communication device. For each of the destination communication devices, the transmitter 12 transmits data to that destination communication device at a rate that does not exceed the upper limit transmission rate recorded in rate list T.

The rate manager 20 may be implemented by a processor system including a processor and a memory. In such a case, the memory in the processor system stores a program describing the functions of the first calculator 21, the notification unit 22, and the second calculator 23. The processor executes this program to provide the functions of the first calculator 21, the notification unit 22, and the second calculator 23. This processor system can receive information (information indicating the reception bandwidth for example) notified by the destination communication device via the receiver 11 and process the received information.

FIG. 10 through FIG. 14 are flowcharts illustrating the processes that the communication device 1 performs when receiving data from a different communication device. FIG. 15 through FIG. 20 are flowcharts illustrating the processes that the communication device 1 performs when transmitting data to a different communication device. A communication device that receives data from a different communication device may be referred to as a destination communication device in the descriptions below. Also, a communication device that transmits data to a different communication device may be referred to as a source communication device in the descriptions below.

Figure 10:
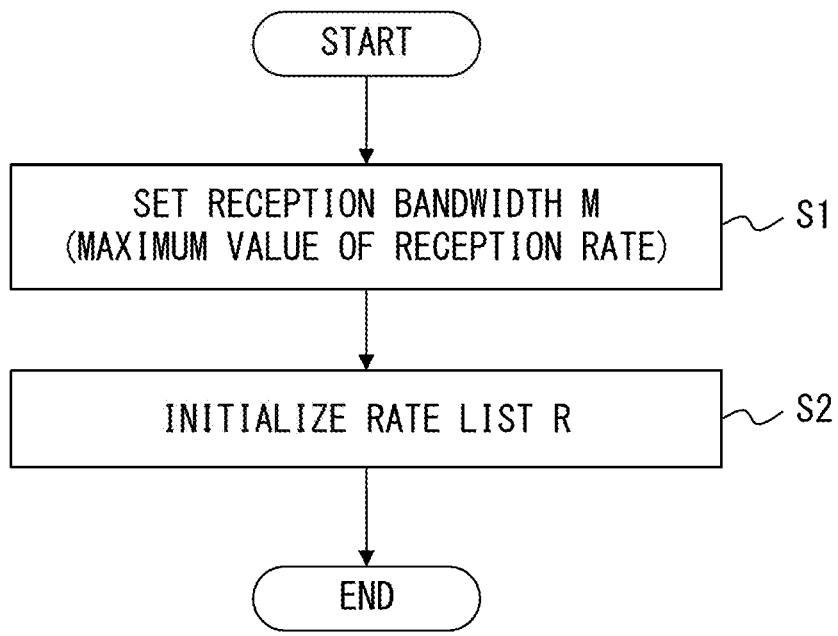
FIG. 10 is a flowchart illustrating an example of the initial setting for a destination communication device.

FIG. 10 is a flowchart illustrating an example of the initial setting for a destination communication device. The process in this flowchart is performed when a destination communication device is activated.

In S1, the rate manager 20 sets reception bandwidth M. Reception bandwidth M is equivalent to the maximum reception rate for the communication device 1. Reception bandwidth M is a known value. In S2, the rate manager 20 initializes rate list R.

Figure 11:
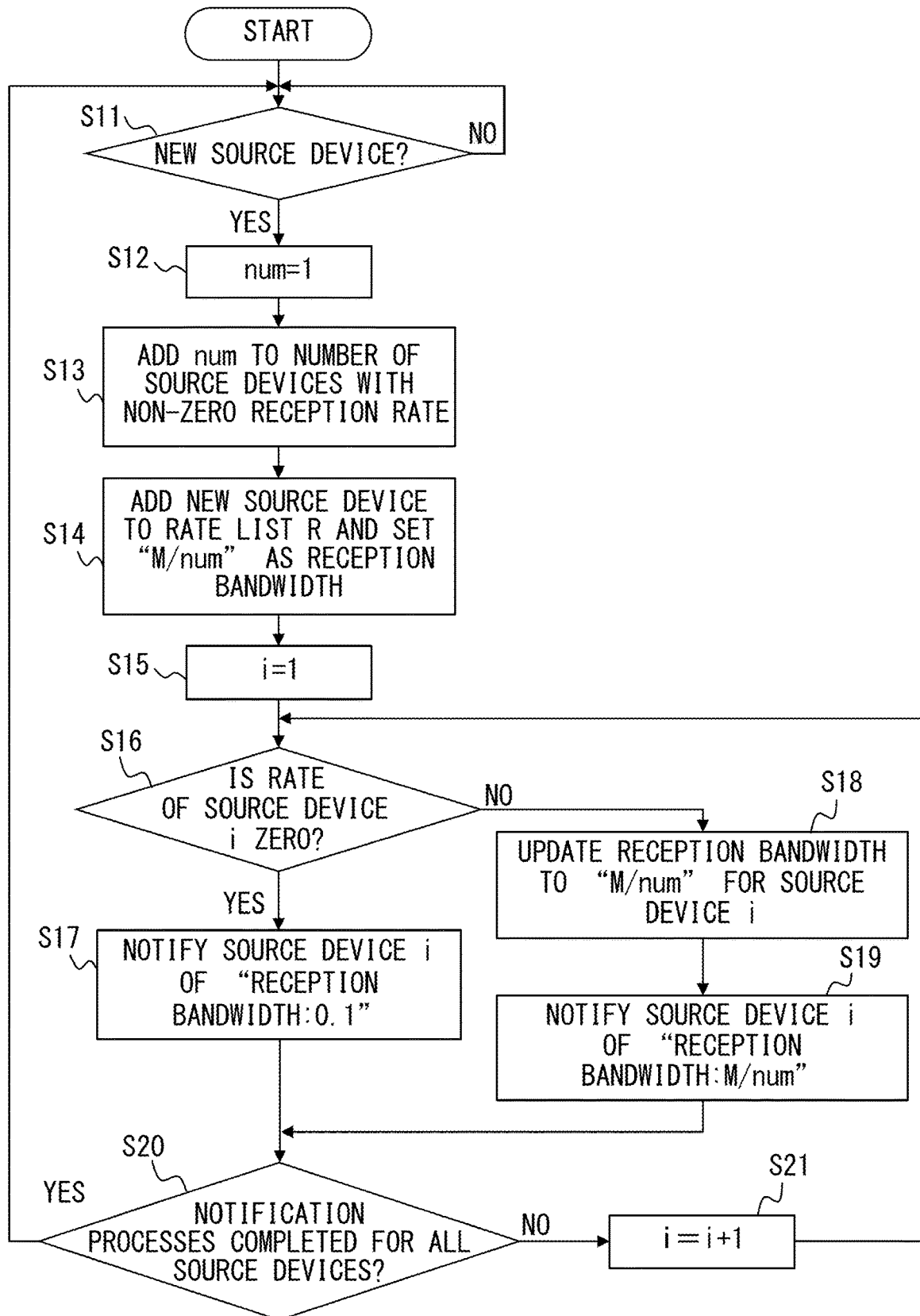
FIG. 11 is a flowchart illustrating an example of a process that a destination communication device performs when a new source communication device is connected.

FIG. 11 is a flowchart illustrating an example of a process that a destination communication device performs when a new source communication device is connected.

In S11, the rate manager 20 monitors a connection request generated by a new source communication device. The connection request is generated by for example a source communication device before that source communication device starts a data transmission. When detecting the connection request, the rate manager 20 sets variable num to "1" in S12. Variable num is used for counting the number of source communication devices in FIG. 11 through FIG. 14.

In S13, the rate manager 20 counts the number of source communication devices whose reception rate is not zero in rate list R, and adds variable num to the number of such source communication devices. Thereby, variable num indicates the total number of the source communication devices (including the new source communication device).

In S14, the rate manager 20 adds a new source communication device to rate list R, and sets "M/num" as the reception bandwidth of the new source communication device. Specifically, a value obtained by dividing the reception bandwidth of the communication device 1 by the number of source communication devices is set as the reception bandwidth of the new source communication device.

In S15, the rate manager 20 initializes variable i. Variable i is for identifying a source communication device recorded in rate list R. Thus, the initial value of variable i is "1". A source communication device identified by using variable i may be referred to as "source communication device i" in the descriptions below.

In S16, the rate manager 20 determines whether the rate of data received from source communication device i is zero. Note that the communication devices 1 have a function of monitoring the rate of data received from each source communication device.

When the reception rate is zero (YES in S16), the rate manager 20 notifies source communication device i of "reception bandwidth: 0.1" in S17. This reception bandwidth is equivalent to the upper limit of the reception rate permitted by a communication device 1 for the data transmission from communication device i to the communication device 1.

When the reception rate is not zero (NO in S16), the rate manager 20 updates, to "M/num", the reception bandwidth for source communication device i registered in rate list R. In S19, the rate manager 20 notifies source communication device i of "reception bandwidth: M/num".

In S20, the rate manager 20 determines whether the notification processes in S16 through S19 have been completed for all the source communication devices in rate list R. When there is a source communication device for which the notification processes in S16 through S19 have not been completed (NO in S20), variable i is incremented in S21, and the process by the rate manager 20 returns to S16. When the notification processes in S16 through S19 have been completed for all the source communication devices (YES in S20), the process by the rate manager 20 returns to S11.

As described above, the communication device 1 updates the reception bandwidth of each source communication device in response to the addition of a new source communication device. The communication device 1 then notifies each source communication device of the updated reception bandwidth.

In the example illustrated in FIG. 2, when the communication device 1c receives a connection request from the communication device 1a, the communication device 1c calculates the reception bandwidth to be allocated to the communication device 1a and notifies the communication device 1a of the reception bandwidth. In the case of FIG. 3, when the communication device 1c receives a connection request from the communication device 1b, the communication device 1c calculates reception bandwidths to be allocated respectively to the communication devices 1a and 1b. The communication device 1c then notifies the communication devices 1a and 1b respectively of the calculation results.

Figure 12:
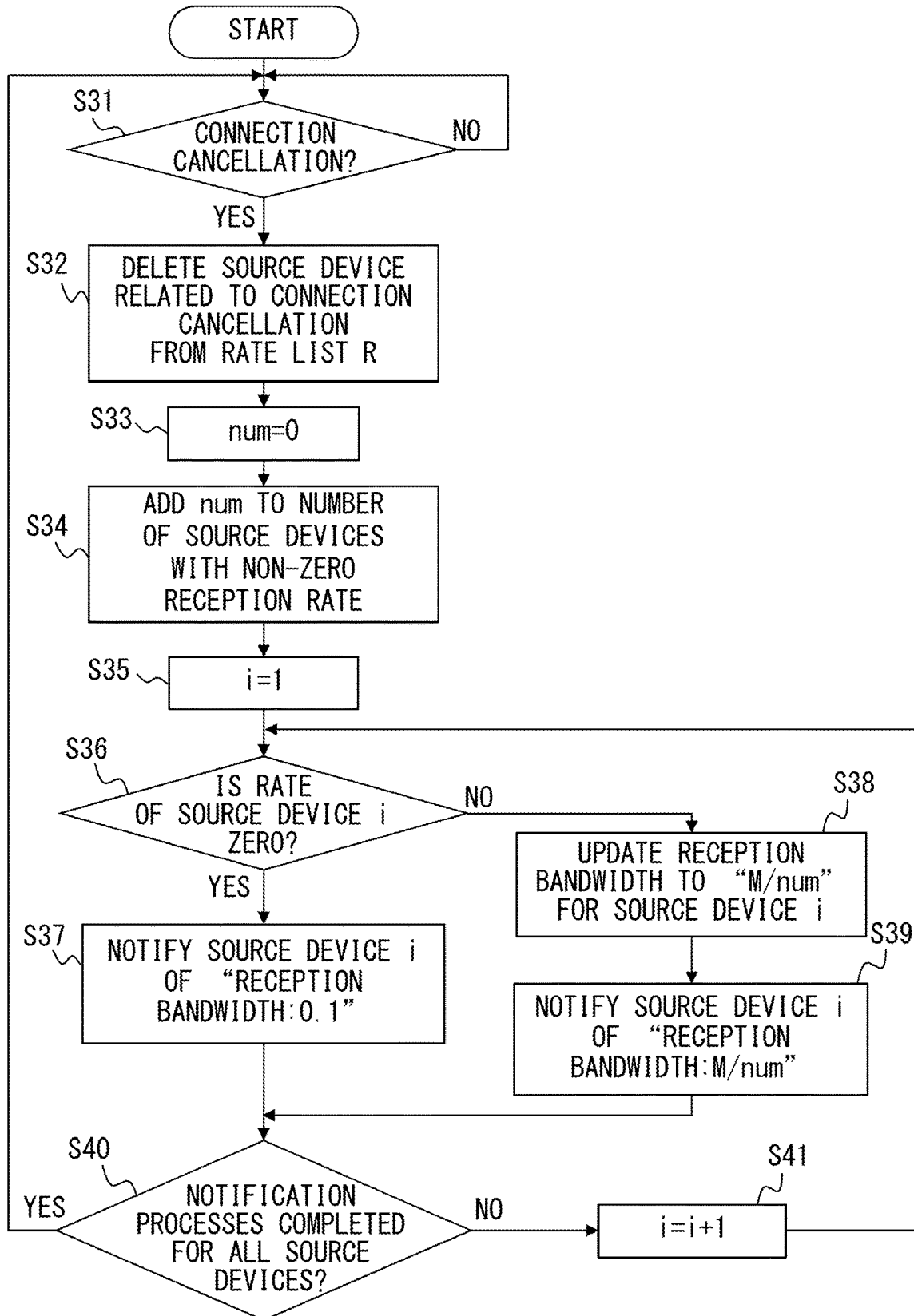
FIG. 12 is a flowchart illustrating an example of a process that a destination communication device performs when the connection to a source communication device is canceled.

FIG. 12 is a flowchart illustrating an example of a process that a destination communication device performs when the connection to the source communication device is canceled.

In S31, the rate manager 20 monitors a connection cancellation request. The connection cancellation request is generated by for example the source communication device. When detecting the connection cancellation request, the rate manager 20 deletes the source communication device that generated the connection cancellation request from rate list R in S34. In S33, the rate manager 20 sets variable num to zero.

In S34, the rate manager 20 counts the number of source communication devices whose reception rate is not zero in rate list R, and adds variable num to the number of such source communication devices. Thereby, variable num indicates the total number of the source communication devices (excluding the source communication device that generated the connection cancellation request). In S35, the rate manager 20 initializes variable i to "1".

The processes in S36 through S41 are substantially the same as those in S16 through S21 in FIG. 11. Specifically, when the rate of data received from source communication device i is zero, the rate manager 20 notifies source communication device i of "reception bandwidth: 0.1". When the rate of data received from source communication device i is not zero, the rate manager 20 notifies source communication device i of "reception bandwidth: M/num". However, variable num in S36 through S41 indicates the number of source communication devices excluding the source communication device that issued the connection cancellation request. Thus, since the number of source communication devices decreases, the reception bandwidths that are respectively allocated to the other source communication devices increase.

Figure 13:
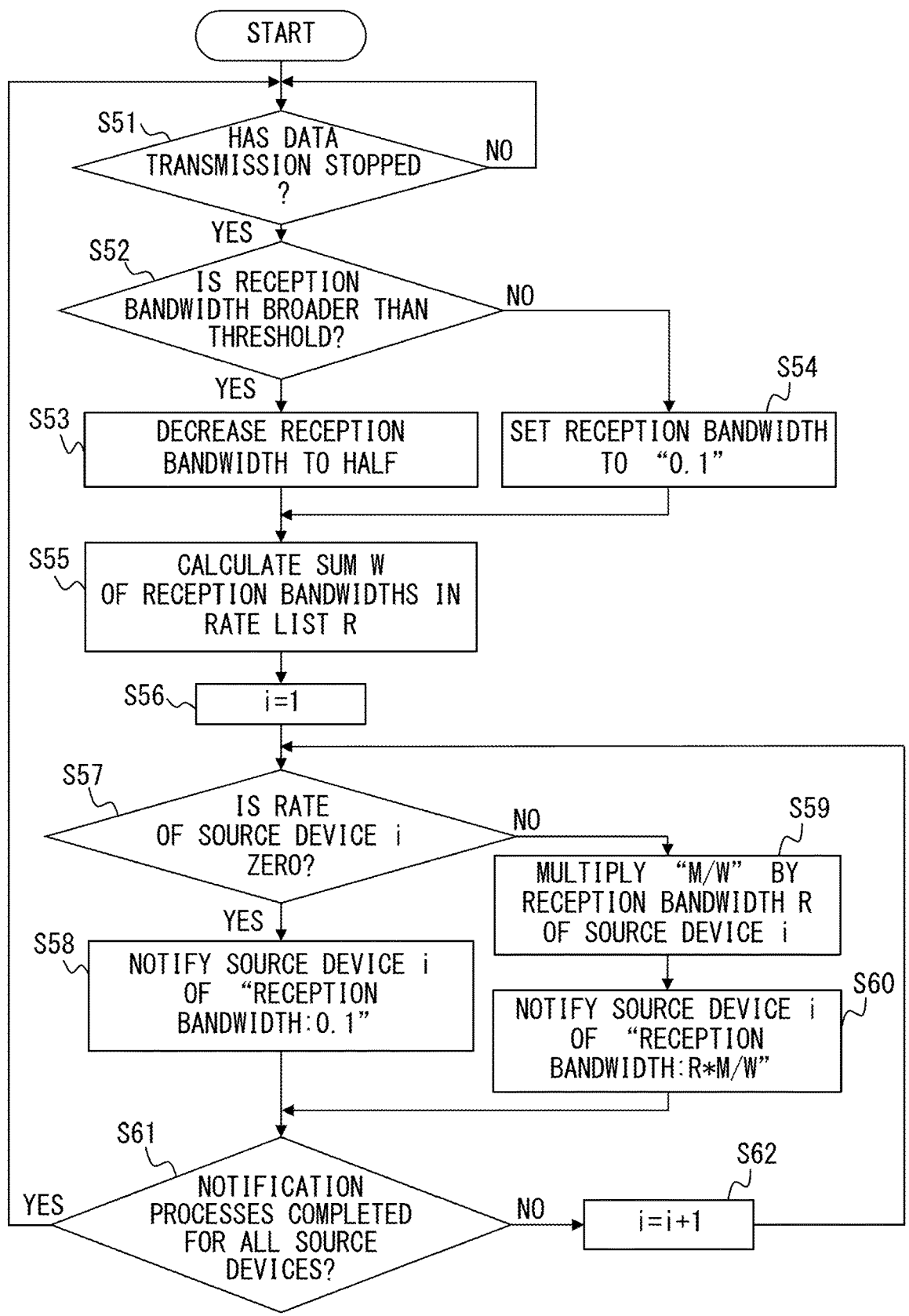
FIG. 13 is a flowchart illustrating an example of a process that a destination communication device performs when the data transmission from a source communication device stops.

FIG. 13 is a flowchart illustrating an example of a process that a destination communication device performs when the data transmission from the source communication device stops.

In S51, the rate manager 20 monitors the rate of data received from each source communication device. The process performed by the rate manager 20 proceeds to S52 when a source communication device for which a prescribed period of time has elapsed since the source communication device stopped its data transmission is detected. A source communication device that has stopped its data transmission may be referred to as a target source communication device in the descriptions below.

In S52, the rate manager 20 determines whether the reception bandwidth allocated to the target source communication device recorded in rate list R is broader than a prescribed threshold. When the reception bandwidth allocated to the target source communication device is broader than the prescribed threshold (YES in S52), the rate manager 20 decreases the reception bandwidth to half in S53. When the reception bandwidth allocated to the target source communication device is narrower than or equal to the prescribed threshold (NO in S52), the rate manager 20 updates the reception bandwidth to "0.1".

Figure 14:
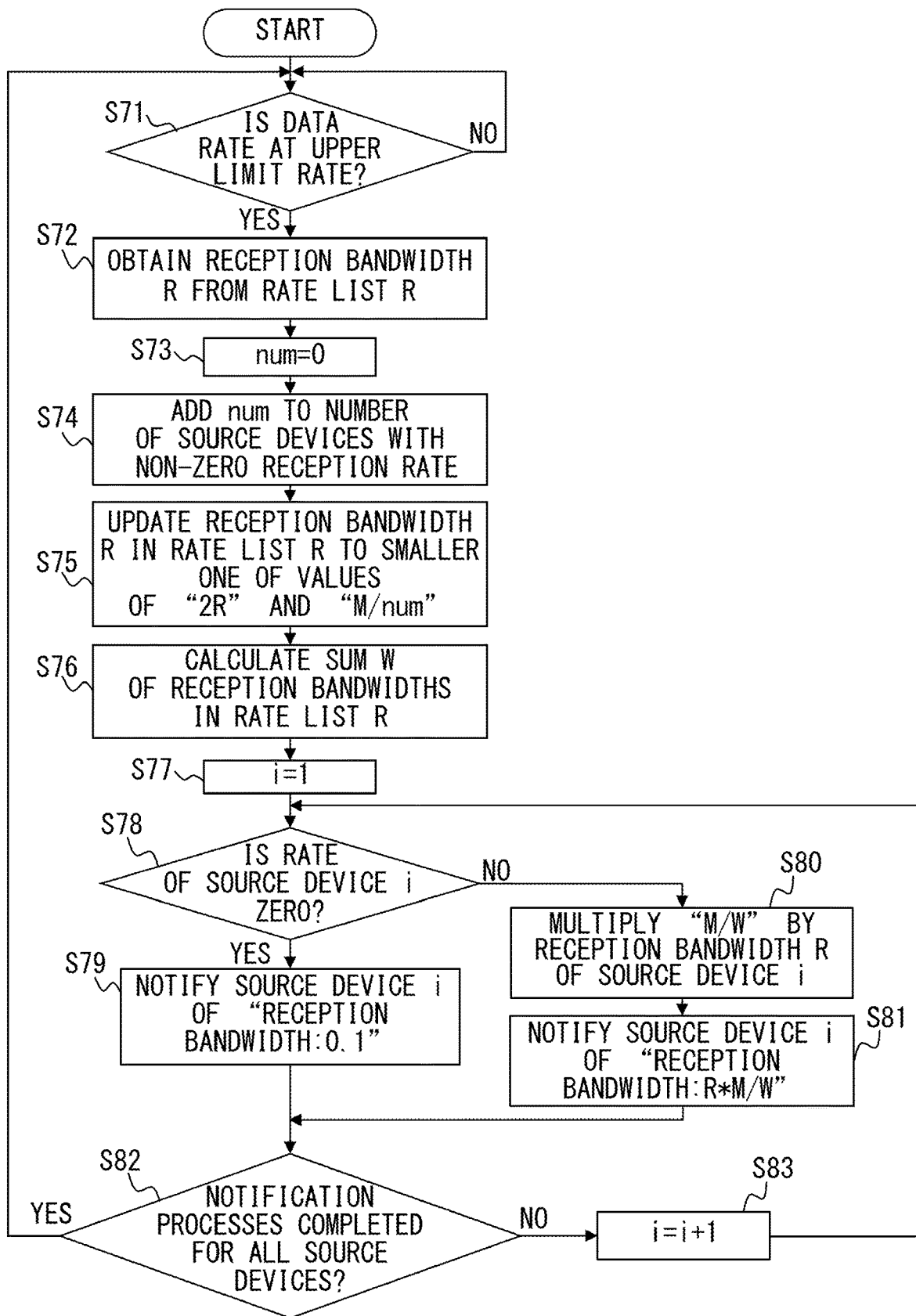
FIG. 14 is a flowchart illustrating an example of a process that a destination communication device performs when the data reception rate is at the upper limit rate.

In S55, the rate manager 20 calculates sum W of the reception bandwidths recorded in rate list R. In FIG. 13 and FIG. 14, sum W is equivalent to the sum of the bandwidths to be allocated to the source communication devices. In S56, the rate manager 20 initializes variable i to "1".

The processes in S57 through S62 are similar to those in S16 through S21 illustrated in FIG. 11. Specifically, when the rate of data received from source communication device i is zero, the rate manager 20 notifies source communication device i of "reception bandwidth: 0.1". When the rate of data received from source communication device i is not zero, in S59, the rate manager 20 multiplies "M/W" by the reception bandwidth of source communication device i recorded in rate list R. In other words, when the reception bandwidth allocated to source communication device i is "R", "R" is updated to "R*M/W" in S59. In such a case, the rate manager 20 notifies source communication device i of "reception bandwidth: R*M/W". As described above, "M" indicates the reception bandwidth of the communication device 1 (or the maximum value of the reception rate of the communication device 1). Note that the processes in S57 through S62 do not need to be performed for the target source communication device.

It is assumed for example that rate list R is as illustrated in FIG. 9A and the communication device 1b has stopped its data transmission. In such a case, the target source communication device is the communication device 1b. Then, the reception bandwidth of the communication device 1b recorded in rate list R is updated from 5 Gbps to 2.5 Gbps in S53. In addition, 7.5 Gbps is obtained as sum W of the reception bandwidths in S55. Thus, the reception bandwidth to be allocated to the communication device 1a is updated from 5 Gbps to 5*(10/7.5) Gbps. As described above, when the data transmission from a communication device (the communication device 1b in this case) stops, the bandwidths to be allocated to the other different source communication devices (the communication device 1a in this case) increase. Thus, the efficiency in data transmissions is improved.

The bandwidth to be allocated to a target source communication device gradually decreases with the repetition of the processes in S51 through S62. In the example illustrated in FIG. 4, the bandwidth to be allocated to the communication device 1b decreases gradually to 0.1. During this process, the bandwidth to be allocated to the other communication device (i.e., the communication device 1a) increases gradually.

FIG. 14 is a flowchart illustrating an example of a process that a destination communication device performs when the data reception rate is at the upper limit rate.

In S71, the rate manager 20 monitors the rate of data received from each source communication device. The process performed by the rate manager 20 proceeds to S72 when a source communication device whose data rate has been at its corresponding upper limit rate for a prescribed period of time is detected. This upper limit rate may be equivalent to the reception bandwidth allocated to its corresponding source communication device. A source communication device whose data rate reaches the corresponding upper limit rate may be referred to as a target source communication device in the descriptions below.

In S72, the rate manager 20 obtains reception bandwidth R of the target source communication device from rate list R. In S73, the rate manager 20 sets variable num to zero. In S74, the rate manager 20 counts the number of source communication devices whose reception rate is not zero in rate list R, and adds variable num to the number of such source communication devices. Thereby, variable num indicates the total number of the source communication devices (including the target source communication device).

In S75, the rate manager 20 selects the smaller one of the values of "2*R" and "M/num" for the target source communication device. The rate manager 20 then updates the reception bandwidth of the target source communication device to the selected value in rate list R. In S76, the rate manager 20 calculates sum W of the reception bandwidths recorded in rate list R. In S77, the rate manager 20 initializes variable i to "1".

The processes in S78 through S83 are substantially the same as those in S57 through S62 illustrated in FIG. 13. Specifically, when the rate of data received from source communication device i is zero, the rate manager 20 notifies source communication device i of "reception bandwidth: 0.1". When the rate of data received from source communication device i is not zero, the rate manager 20 notifies source communication device i of "reception bandwidth: R*M/W". Here, "M" indicates the reception bandwidth of the communication device 1 (or the maximum value of the reception rate of the communication device 1) as described above. Also, the processes in S78 through S83 do not need to be performed for the target source communication device.

As described above, when the rate of data received from a source communication device reaches its upper limit rate, the rate manager 20 increases the bandwidth to be allocated to that source communication device. In other words, a broader bandwidth is allocated to a source communication device that requires a high-speed communication. Thus the efficiency in data transmissions is improved.

FIG. 15 is a flowchart illustrating an example of the initial setting for a source communication device. The process in this flowchart is performed when a source communication device is activated.

In S101, the rate manager 20 sets transmission bandwidth M. Transmission bandwidth M is equivalent to the maximum value of the transmission rate of the communication device 1. Transmission bandwidth M is a known value. In S102, the rate manager 20 initializes rate list T.

FIG. 16 is a flowchart illustrating an example of a process that a source communication device performs when it is connected to a new destination communication device.

In S111, the rate manager 20 determines whether the source communication device is connected to a new destination communication device. Note that when the communication device 1 is to be connected to a new destination communication device, for example the transceiver 10 generates a connection request.

In S112, the rate manager 20 obtains reception bandwidth R notified by the new destination communication device. Information that indicates the reception bandwidth notified by the destination communication device is received through the receiver 11 illustrated in FIG. 8, and is forwarded to the rate manager 20. In other words, the rate manager 20 receives information that indicates the reception bandwidth notified by the destination communication device. Then, the rate manager 20 records the notified reception bandwidth R in rate list T. Note that the new destination communication device performs the process in the flowchart of FIG. 11, and notifies the source communication device of reception bandwidth R in S17 or S19.

In S113, the rate manager 20 sets variable num to "1". Variable num is used for counting the number of destination communication devices in FIG. 16 and FIG. 19. In S114, the rate manager 20 counts the number of destination communication devices, for which a transmission rate of data transmitted to the destination communication device is not zero, in rate list T, and adds variable num to the number of such destination communication devices. Thereby, variable num indicates the total number of the destination communication devices (including the new destination communication device).

In S115, the rate manager 20 adds the new destination communication device to rate list T, and sets "M/num" as transmission bandwidth T of the new destination communication device. In other words, the value obtained by dividing the transmission bandwidth of the communication device 1 by the number of destination communication devices is set as transmission bandwidth T of the new destination communication device.

In S116, the rate manager 20 calculates sum W of transmission bandwidths T of the destination communication devices recorded in rate list T. In FIG. 16 through FIG. 20, sum W is equivalent to the sum of the bandwidths to be allocated to communications with destination communication devices.

In S117, the rate manager 20 initializes variable j to "1". Variable j is for identifying a destination communication device registered in rate list T. Note that a destination communication device identified by using variable j may be referred to as "destination communication device j" in the descriptions below.

In S118, the rate manager 20 determines whether the rate of data to be transmitted to destination communication device j is zero. The data transmission rate is notified for example by the transceiver 10 to the rate manager 20.

When the data transmission rate is not zero (NO in S118), in S119, the rate manager 20 calculates transmission bandwidth T to be allocated to destination communication device j. This transmission bandwidth T is calculated by for example dividing transmission bandwidth M of the communication device 1 (i.e., the maximum value of the transmission rate of the communication device 1) by the number of destination communication devices. When rate list T has already recorded transmission bandwidth T of destination communication device j, the rate manager 20 may update that transmission bandwidth T to "T*M/W". Note that the process in S119 may be skipped for the new destination communication device.

In S120, the rate manager 20 selects the smaller one of the values of reception bandwidth R obtained from destination communication device j and transmission bandwidth T to be allocated to destination communication device j. The rate manager 20 then uses the selected value to update upper limit transmission rate V of destination communication device j recorded in rate list T. In other words, transmission bandwidth T is recorded as upper limit transmission rate V when the transmission bandwidth T is narrower than reception bandwidth R. When reception bandwidth R is narrower than transmission bandwidth T, the reception bandwidth R is recorded as upper limit transmission rate V. Note that when the transmission rate is zero (YES in S118), the processes in S119 and S120 are skipped.

In S121, the rate manager 20 determines whether the updating processes in S118 through S120 have been completed for all the destination communication devices in rate list T. When there is a destination communication device for which the update processes in S118 through S120 have not been completed (NO in S121), variable j is incremented in S122, and the process by the rate manager 20 returns to S118. When the update processes in S118 through S120 have been completed for all the destination communication devices (YES in S121), the process by the rate manager 20 returns to S111.

The source communication device controls the data transmission to each destination communication device according to upper limit transmission rate V that is determined for each destination communication device in the above manner. In other words, the transmitter 12 illustrated in FIG. 8 transmits data to a destination communication device at a rate that does not exceed upper limit transmission rate V. It is assumed for example that "transmission bandwidth T: 10 Gbps" has been obtained in the communication device 1a of FIG. 2 and FIG. 3 for the data transmission to the communication device 1c. Then, when "reception bandwidth R: 10 Gbps" has been notified by the communication device 1c as illustrated in FIG. 2, upper limit transmission rate V is 10 Gbps. In this case, the communication device 1a transmits data to the communication device 1c at a rate that does not exceed 10 Gbps. Thereafter, when "reception bandwidth R: 5 Gbps" is notified by the communication device 1c as illustrated in FIG. 3, upper limit transmission rate V is updated to 5 Gbps. Then the communication device 1a transmits data to the communication device 1c at a rate that does not exceed 5 Gbps.

FIG. 17 is a flowchart illustrating an example of a process that a source communication device performs when the connection to a destination communication device is canceled.

In S131, the rate manager 20 determines whether or not a connection to the destination communication device has been canceled. Note that when the communication device 1 cancels the connection to a destination communication device, for example the transceiver 10 generates a connection cancellation request. When a connection cancellation request is detected, the rate manager 20 deletes the destination communication device corresponding to the detected connection cancellation request from rate list T in S132.

In S133, the rate manager 20 calculates sum W of transmission bandwidths T of the destination communication devices recorded in rate list T. When the rate manager 20 calculates sum W, the destination communication device whose connection was canceled has already been deleted from rate list T. In S134, the rate manager 20 initializes variable j to "1".

The processes in S135 through S139 are substantially the same as those in S118 through S122 illustrated in FIG. 16. Specifically, the cancellation of the connection with a destination communication device causes the updating of transmission bandwidths T to be allocated to the other destination communication devices. Further, upper limit transmission rate V is calculated for each of the other destination communication devices based on reception bandwidth R that was notified by the destination communication device and the updated transmission bandwidth T.

In this example, the cancellation of the connection with a destination communication device decreases sum W that is calculated in S133. Thus, when transmission bandwidth T is updated to "T*M/W", the updated transmission bandwidth T is broader than before the cancellation of the connection to a destination communication device. As a result, upper limit transmission rate V may increase. Specifically, when the connection to a destination communication device is canceled, the bandwidth that was allocated to the communications with that destination communication device is allocated to the other destination communication devices, promoting the efficiency in communications with the other destination communication devices.

Figure 18:
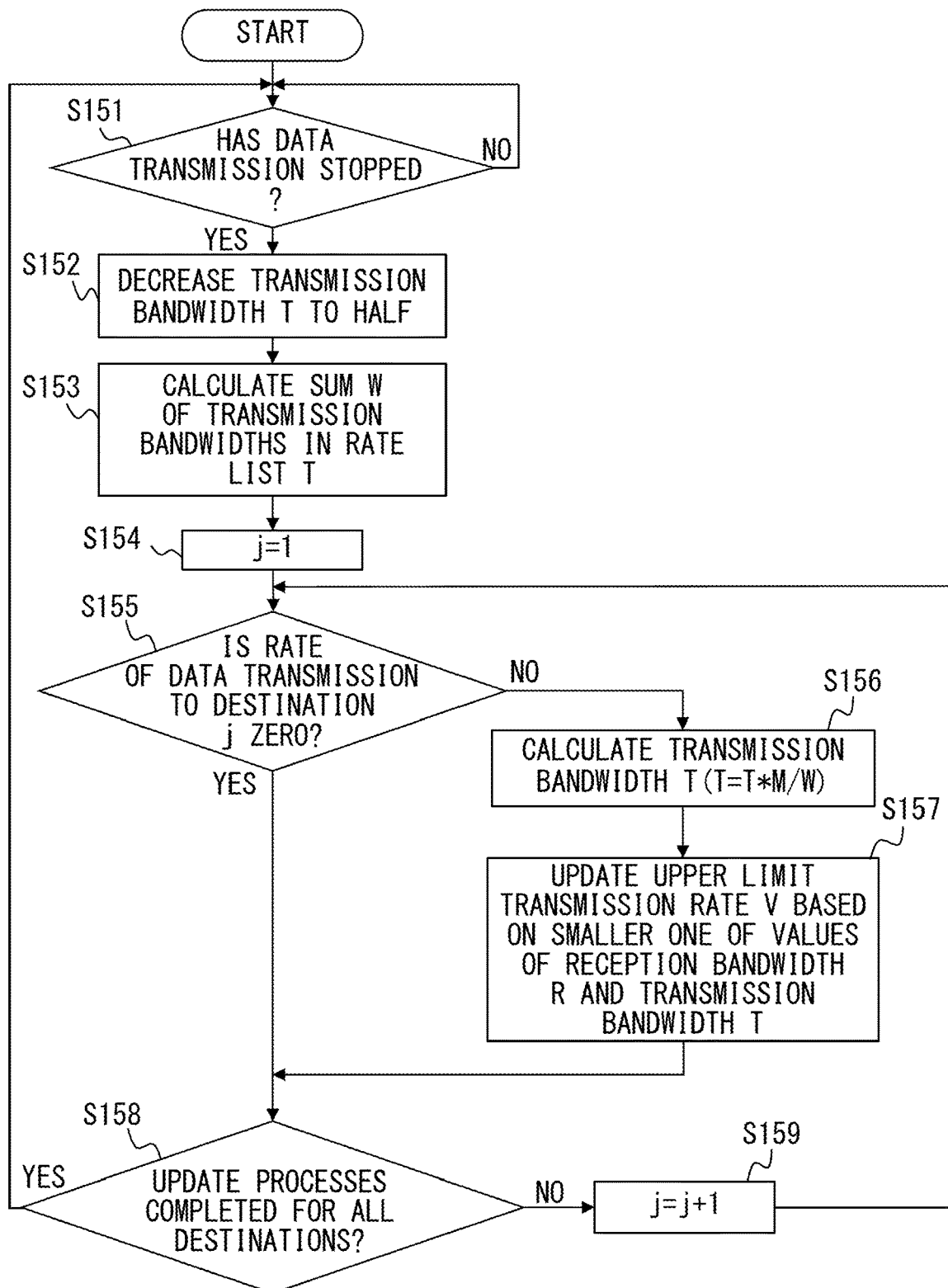
FIG. 18 is a flowchart illustrating an example of a process that a source communication device performs when the data transmission to a destination communication device stops.

FIG. 18 is a flowchart illustrating an example of a process that a source communication device performs when the data transmission to a destination communication device stops.

In S151, the rate manager 20 monitors the rate of data to be transmitted to each destination communication device. The process performed by the rate manager 20 proceeds to S152 when a destination communication device for which data transmission to the destination communication device stops for a prescribed period of time. A destination communication device for which data transmission to the destination communication device stops may be referred to as a target destination communication device in the descriptions below.

In S152, the rate manager 20 decreases, to half, transmission bandwidth T of the target destination communication device recorded in rate list T. In S153, the rate manager 20 calculates sum W of transmission bandwidths T recorded in rate list T. In S154, the rate manager 20 initializes variable j to "1".

The processes in S155 through S159 are substantially the same as those in S118 through S112 illustrated in FIG. 16. Accordingly, when the data transmission to a target destination communication device stops, transmission bandwidth T to be allocated to each destination communication device is updated. Further, upper limit transmission rate V is calculated for each destination communication device based on reception bandwidth R that was notified by the destination communication device and the updated transmission bandwidth T.

It is assumed that the data transmission to the communication device 1d stops when rate list T implemented in the communication device 1a is as illustrated in FIG. 9B. In such a case, the target destination communication device is the communication device 1d. Then, transmission bandwidth T of the communication device 1d recorded in rate list T is updated from 5 Gbps to 2.5 Gbps in S152. Also, 7.5 Gbps is obtained as sum W of transmission bandwidths T in S153. Then transmission bandwidth T to be allocated to the data transmission to the communication device 1c is updated from 5 Gbps to 5*10/7.5 Gbps. As described above, when the data transmission to a communication device (the communication device 1d in this case) stops, the bandwidths to be allocated respectively to the other source communication devices (the communication device 1c in this case) increase. This promotes the efficiency in data transmissions.

Note that the upper limit rate of the data transmission to a target destination communication device gradually decreases with the repetition of the processes in S151 through S159. In the example illustrated in FIG. 6, the bandwidth to be allocated to the communication device 1d decreases gradually. During this process, the bandwidth to be allocated to the other communication device (i.e., the communication device 1c) increases gradually.

Figure 19:
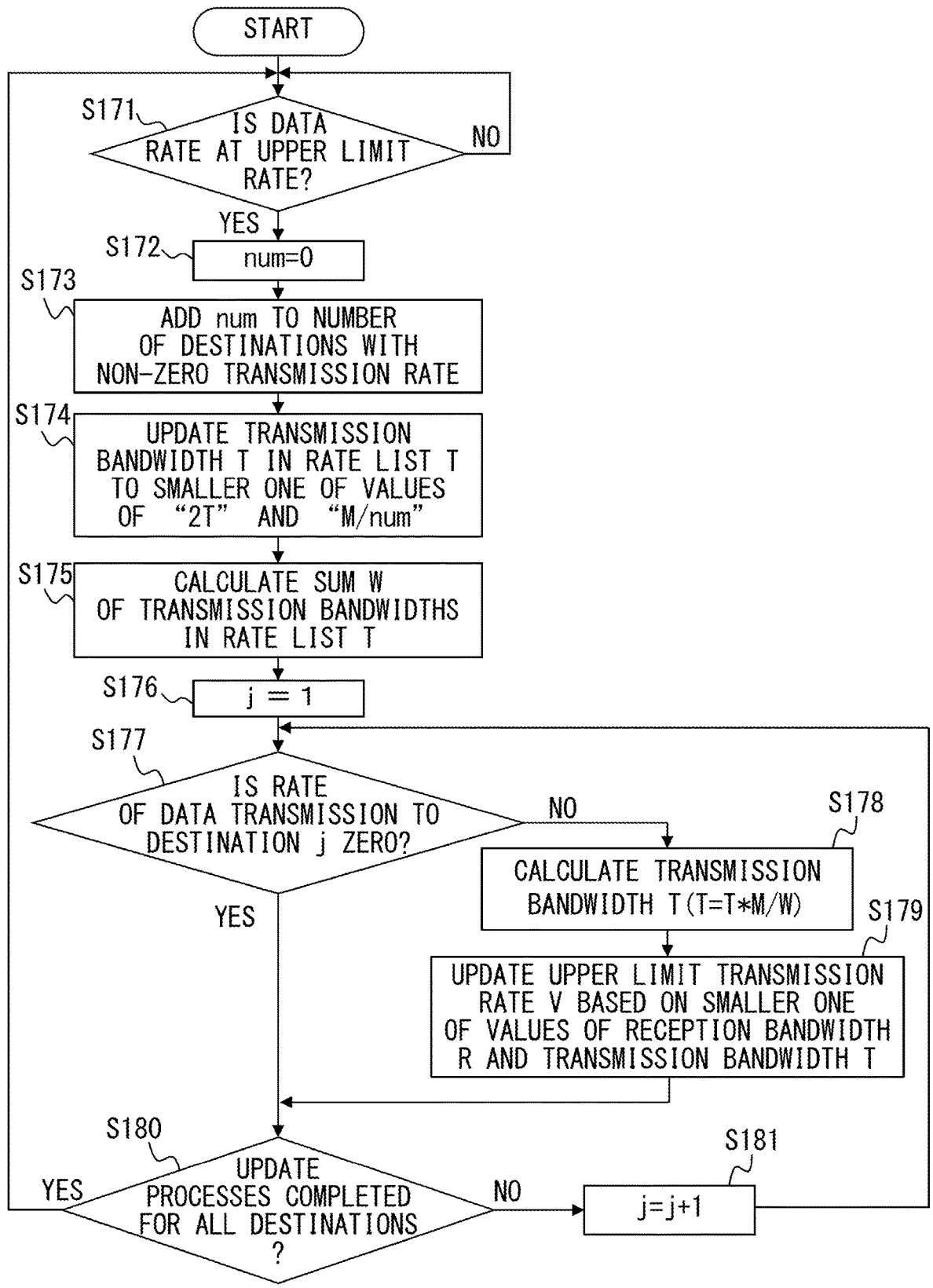
FIG. 19 is a flowchart illustrating an example of a process that a source communication device performs when the data transmission rate is at the upper limit rate.

FIG. 19 is a flowchart illustrating an example of a process that a source communication device performs when the data transmission rate is at the upper limit rate.

The rate manager 20 monitors the rate of data to be transmitted to each destination communication device in S171. The process performed by the rate manager 20 proceeds to S172 when a destination communication device for which a transmission rate of data transmitted to the destination communication device is at corresponding upper limit transmission rate V for a prescribed period of time is detected. A destination communication device for which a transmission rate of data transmitted to the destination communication device reaches corresponding upper limit transmission rate V may be referred to as a target destination communication device in the descriptions below.

The rate manager 20 sets variable num to zero in S172. In S173, the rate manager 20 counts the number of destination communication devices whose transmission rate is not zero in rate list T, and adds variable num to the number of such destination communication devices. Thereby, variable num indicates the total number of the destination communication devices (including the target destination communication device).

The rate manager 20 selects the smaller one of the values of "2*T" and "M/num" for the target destination communication device in S174. The rate manager 20 then updates transmission bandwidth T of the target destination communication device to the selected value in rate list T. In S175, the rate manager 20 calculates sum W of transmission bandwidths T recorded in rate list T. When the rate manager 20 calculates sum W, the transmission bandwidth of the target destination communication device has already been updated to "2*T" or "M/num". In S176, the rate manager 20 initializes variable j to "1".

The processes in S177 through S181 are substantially the same as those in S118 through S122 illustrated in FIG. 16. Thus, when the rate of the data transmission to a destination communication device (i.e., a target destination communication device) reaches upper limit transmission rate V, transmission bandwidth T of each destination communication device is updated. Further, upper limit transmission rate V is calculated for each destination communication device based on reception bandwidth R that was notified by the destination communication device and the updated transmission bandwidth T. In such a case, since the transmission bandwidth to be allocated to the target destination communication device increases, the upper limit transmission rate may be increased. On the other hand, since the transmission bandwidths to be allocated respectively to the other destination communication devices decrease, the upper limit transmission rates of the other destination communication devices may be decreased.

Figure 20:
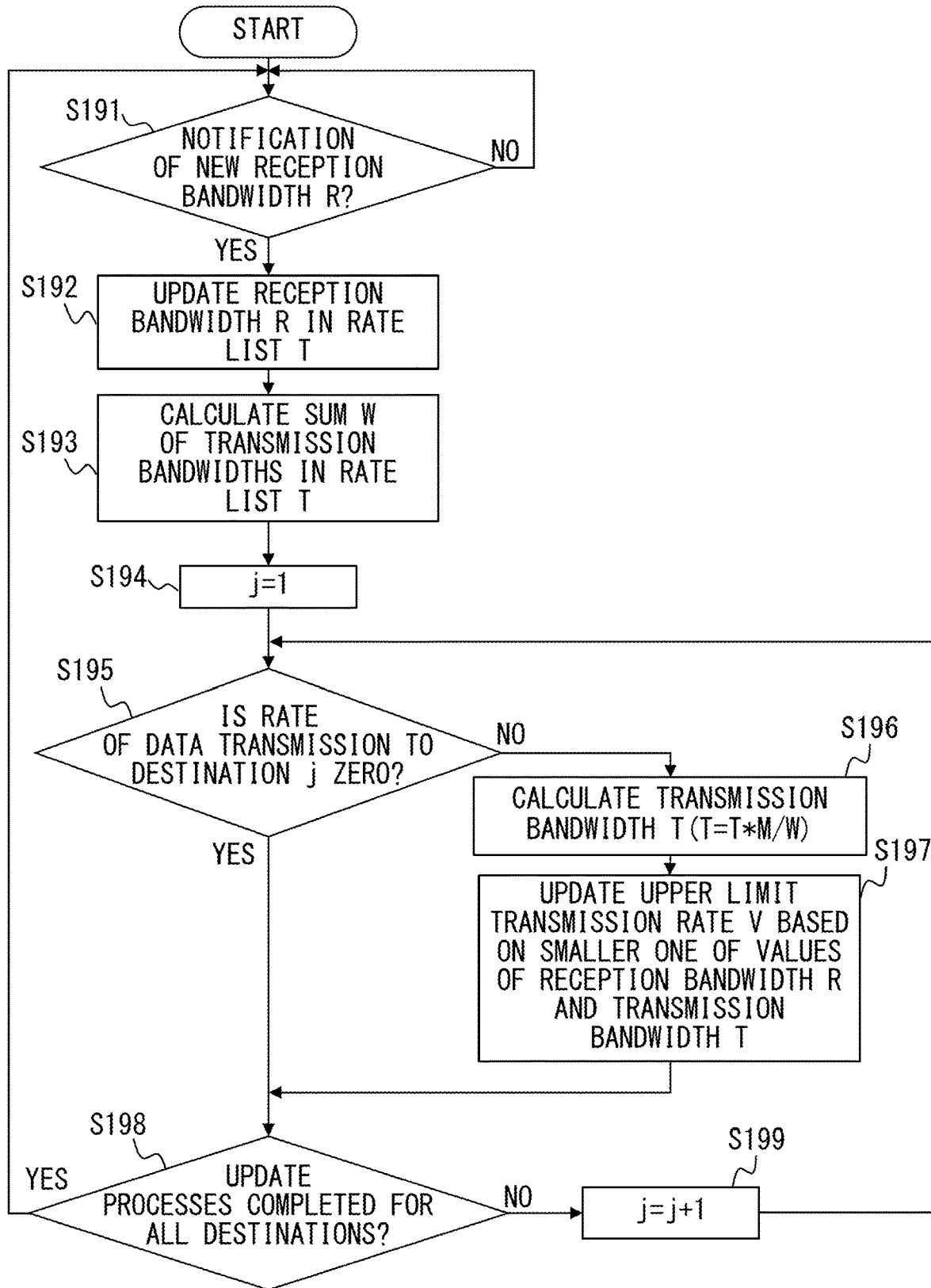
FIG. 20 is a flowchart illustrating an example of a process performed by a source communication device that was notified of a reception bandwidth by a destination communication device.

FIG. 20 is a flowchart illustrating an example of a process performed by a source communication device that was notified of the reception bandwidth by the destination communication device.

In S191, the rate manager 20 waits for notification of new reception bandwidth R from a destination communication device. Upon receiving notification of new reception bandwidth R, the process performed by the rate manager 20 proceeds to S192.

In S192, the rate manager 20 updates reception bandwidth R corresponding to the destination communication device that notified the new reception bandwidth R in rate list T. In other words, the reception bandwidth R recorded in rate list T is updated to the newly notified reception bandwidth R. In S193, the rate manager 20 calculates sum W of transmission bandwidths T recorded in rate list T. In S194, the rate manager 20 initializes variable j to "1".

The processes in S195 through S199 are substantially the same as those in S118 through S122 illustrated in FIG. 16. Accordingly, notification of new reception bandwidth R by a destination communication device causes recalculation of upper limit transmission rate V of each destination communication device.

Other Embodiments

Upper limit rates may be prepared for respective users based on contract, etc. in the communication system 100 illustrated in FIG. 1. For example, the data transmission of a user having a contract with a low communication is controlled so as not to exceed a prescribed upper limit rate even when there is a broad unoccupied bandwidth. Alternatively, a prescribed lower limit rate is guaranteed for the data transmission of a user having a contract with a high communication fee.

When a contract specifies an upper limit rate of a source communication device (such an upper limit rate will be hereinafter referred to as a contracted upper limit rate), the receiving communication device may allocate, to the source communication device, reception bandwidth R that indicates the smaller one of the values of "M/num" and the bandwidth corresponding to the contracted upper limit rate. The receiving communication device notifies the source communication device of this reception bandwidth R. "M" indicates the reception bandwidth of the communication device 1, and "num" indicates the number of source communication devices. The source communication device provisionally determines an upper limit rate based on for example the smaller one of the values of reception bandwidth R notified by the destination communication device and transmission bandwidth T calculated by the source communication device itself. The source communication device then uses, as upper limit transmission rate V, the smaller one of the values of the provisionally determined upper limit rate and the contracted upper limit rate.

It is assumed that a contract specifies a lower limit rate (such a lower limit rate will be hereinafter referred to as a contracted lower limit rate) for the data transmission from communication device X to communication device Y (which will be hereinafter referred to as a preferential data transmission). In such a case, communication device Y allocates, to the preferential data transmission, reception bandwidth R that indicates for example the greater one of the values of the bandwidth corresponding to the contracted lower limit rate and "M/num". Note that "M" indicates the reception bandwidth of the communication device 1, and "num" indicates the number of source communication devices. Then, communication device Y notifies communication device X of this reception bandwidth R. In this case, the remaining bandwidth is equally allocated to the other source communication devices in communication device Y. This means that when a bandwidth broader than "M/num" is allocated to a preferential data transmission, a bandwidth narrower than "M/num" is allocated to each of the other source communication devices.

Communication device X calculates the greater one of the values of transmission bandwidth T and a bandwidth, the transmission bandwidth T being obtained by dividing transmission bandwidth M of communication device X by number num of destination communication devices and the bandwidth corresponding to the contracted lower limit rate. Next, communication device X determines upper limit transmission rate V based on the smaller one of the values of the result of this calculation and reception bandwidth R notified by communication device Y. Then, communication device X transmits data to communication device Y at a rate that does not exceed the determined upper limit transmission rate V. Also, communication device X allocates "M/num" to each of the other destination communication devices. However, when reception bandwidth R notified by communication device Y is broader than "M/num", the remaining bandwidth, resulting from subtracting reception bandwidth R from transmission bandwidth M, can be equally allocated to the other destination communication devices.

FIG. 21A and FIG. 21B illustrate examples of preferential data transmissions. In these examples, the contracted lower limit rate is 3 Gbps for the preferential data transmission.

FIG. 21A illustrates an example where "M/num" is 5 Gbps, which is greater than the bandwidth corresponding to the contracted lower limit rate, in communication device Y. In this case, each source communication device is notified of "M/num" by communication device Y as reception bandwidth R. Specifically, communication device Y notifies communication device X of "reception bandwidth R: 5 Gbps". In communication device X, "M/num" is 5 Gbps, which is greater than the bandwidth corresponding to the contracted lower limit rate. In this case, "M/num" is used as communication bandwidth T. In other words, transmission bandwidth T is 5 Gbps. Further, transmission bandwidth T and reception bandwidth R are both 5 Gbps, leading to 5 Gbps as upper limit transmission rate V. Thus, communication device X can transmit data to communication device Y up to 5 Gbps.

FIG. 21B illustrates an example where "M/num" is 2 Gbps, which is smaller than the bandwidth corresponding to the contracted lower limit rate, in communication device Y. In this case, communication device X is notified of "bandwidth corresponding to contracted lower limit rate" as reception bandwidth R by communication device Y. Specifically, communication device Y notifies communication device X of "reception bandwidth R: 3 Gbps". In communication device X, "M/num" is 2.5 Gbps, which is smaller than the bandwidth corresponding to the contracted lower limit rate. In this case, the "bandwidth corresponding to contracted lower limit rate" is used as transmission bandwidth T. In other words, transmission bandwidth T is 3 Gbps. Further, transmission bandwidth T and reception bandwidth R are both 3 Gbps, leading to 3 Gbps as upper limit transmission rate V. Accordingly, a bandwidth of 3 Gbps is secured for the preferential data transmission as described above, and communication device X can transmit data to communication device Y at a rate of 3 Gbps.

Note in this case that a bandwidth, specifically 7/3 Gbps, narrower than "M/num" is allocated to each of the other destinations in communication device X. Also, a bandwidth, specifically 7/4 Gbps, narrower than "M/num" is allocated to each of the other source devices in communication device Y.

EXAMPLES

FIG. 22A and FIG. 22B illustrate examples of a method of controlling a communication rate. As illustrated in FIG. 22A, it is assumed that the communication device 1a transmits data only to the communication devices 1c and 1d, and the communication devices 1c and 1d are respectively receiving data only from the communication device 1a.

The communication device 1a calculates transmission bandwidths to be allocated to the communication devices 1c and 1d. The transmission bandwidth (a_c) to be allocated to the data transmission to the communication device 1c is 5 Gbps and the transmission bandwidth (a_d) to be allocated to the data transmission to the communication device 1d is also 5 Gbps. The communication devices 1c and 1d respectively notify the communication device 1a of the reception bandwidths to be allocated to the data transmissions from the communication device 1a. The reception bandwidth (a_c) notified by the communication device 1c to the communication device 1a is 10 Gbps and the reception bandwidth (a_d) notified by the communication device 1d to the communication device 1a is also 10 Gbps.

The communication device 1a determines upper limit rates respectively of the data transmissions to the communication devices 1c and 1d. The smaller one of the values of the transmission bandwidth (a_c) and the reception bandwidth (a_c) is 5 Gbps in this case. Therefore, the upper limit rate is 5 Gbps for the data transmission from the communication device 1a to the communication device 1c. Similarly, the upper limit rate is 5 Gbps for the data transmission from the communication device 1a to the communication device 1d.

Then the data transmissions respectively from the communication devices 1e, 1f, and 1g to the communication device 1d start as illustrated in FIG. 22B. In this case, the communication device 1d reallocates the reception bandwidths. Four communication devices transmit data to the communication device 1d in the present example. Accordingly, 2.5 Gbps is allocated to each of the communication devices 1a, 1e, 1f, and 1g. Thus, the communication device 1*d* notifies the calculated reception bandwidths (a_d, e_d, f_d, g_d) respectively to the communication devices 1*a*, 1*e*, 1*f*, and 1*g*.

When receiving notification of the reception bandwidth from the communication device 1*d*, the communication device 1*a* recalculates the upper limit transmission rate of the data transmission to each destination communication device. In other words, the rate manager 20 of the communication device 1*a* performs the process in the flowchart of FIG. 20. It is assumed that the transmission bandwidths allocated respectively to the communication devices 1*c* and 1*d* are 5 Gbps in the communication device 1*a*. It is also assumed that 10 Gbps is calculated as sum W in S193.

The communication device 1*a* calculates the upper limit rate of the data transmission to the communication device 1*d*. Reception bandwidth R of 2.5 Gbps is notified by the communication device 1*d* to the communication device 1*a* in this example. Also, 5 Gbps (=5×10/10) is calculated as "T*M/W" in S196. In S197, upper limit transmission rate V (2.5 Gbps) is determined according to the smaller one of the values of notified reception bandwidth R (2.5 Gbps) and "T*M/W" (5 Gbps). Therefore, the communication device 1*a* transmits data to the communication device 1*d* according to this determination, i.e., at a rate that does not exceed 2.5 Gbps.

The communication device 1*a* also calculates the upper limit rate of the data transmission to the communication device 1*c*. Reception bandwidth R of 10 Gbps is notified by the communication device 1*c* to the communication device 1*a* in this case. Also, 5 Gbps (=5×10/10) is calculated as "T*M/W" in S196. In S197, upper limit transmission rate V (5 Gbps) is determined according to the smaller one of the values of notified reception bandwidth R (10 Gbps) and "T*M/W" (5 Gbps). Therefore, the communication device 1*a* transmits data to the communication device 1*c* according to this determination, i.e., at a rate that does not exceed 5 Gbps.

As described above, when the number of communication devices that transmit data to the a destination communication device (the communication device 1*d* in this example) of the communication device 1*a* changes, the upper limit transmission rate of the data transmission from the communication device 1*a* to the destination communication device of the communication device 1*a* changes based on notification by that destination communication device to the communication device 1*a*. This prevents congestion and achieves higher efficiency in data transmissions without a management device dedicated to managing the entire network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication device that is used in a multi-point communication, the communication device comprising:
    a receiver configured to receive, from a target communication device included among one or more destination communication devices of the communication device, information that indicates an individual reception bandwidth allocated to a data transmission conducted from the communication device to the target communication device;
    a processor configured to calculate an individual transmission bandwidth to be allocated to the data transmission conducted from the communication device to the target communication device according to information relating to the one or more destination communication devices; and
    a transmitter configured to transmit data to the target communication device at a rate that does not exceed an upper limit transmission rate, the upper limit transmission rate being determined according to a smaller one of values of the individual reception bandwidth and the individual transmission bandwidth,
    the individual reception bandwidth is obtained by dividing a reception bandwidth of the target communication device by the number of the source communication devices that respectively transmit data to the target communication device, and
    when the communication device stops the data transmission to the target communication device, the receiver receives information indicating decreased individual reception bandwidth from the target communication device, the decreased individual reception bandwidth not being zero.

2. The communication device according to claim 1, wherein the processor calculates the individual transmission bandwidth by dividing a transmission bandwidth of the communication device by the number of the destination communication devices.

3. The communication device according to claim 1, wherein the processor calculates the individual transmission bandwidth according to data transmission rates for transmitting data respectively to the one or more destination communication devices.

4. A communication system that includes a first communication device and a second communication device that transmits data to the first communication device,
    the first communication device comprises a first processor configured
        to calculate a first bandwidth that indicates a bandwidth to be allocated to a data transmission conducted from the second communication device to the first communication device according to information relating to one or more source communication devices including the second communication device, and
        to notify the second communication device of the calculated first bandwidth, and
    the second communication device comprises:
        a second processor configured to calculate a second bandwidth that indicates a bandwidth to be allocated to a data transmission conducted from the second communication device to the first communication device according to information relating to one or more destination communication devices including the first communication device; and
        a transmitter configured to transmit data to the first communication device at a rate that does not exceed an upper limit transmission rate, the upper limit transmission rate being determined according to a smaller one of values of the first bandwidth and the second bandwidth, the first processor obtains the first bandwidth by dividing a reception bandwidth of the first communication device by the number of the source communication devices, and when the first processor detects that the second communication device has stopped the data transmission to the first communication device, the first processor decreases the first bandwidth to a specified minimum amount, the specified minimum amount not being zero, and the first processor notifies the second communication device of the decreased first bandwidth.

5. The communication system according to claim 4, wherein the first processor calculates the first bandwidth according to rates of data respectively received from the source communication devices.

6. The communication system according to claim 4, wherein the first processor decreases the first bandwidth and increases bandwidths to be respectively allocated to the other source communication devices that transmit data to the first communication device when a rate of data transmitted from the second communication device to the first communication device decreases.

7. The communication system according to claim 4, wherein the second processor calculates the second bandwidth by dividing a transmission bandwidth of the second communication device by the number of the destination communication devices.

8. The communication system according to claim 4, wherein the second processor divides a transmission bandwidth of the second communication device by the number of the destination communication devices so as to obtain the second bandwidth.

9. The communication system according to claim 4, wherein the second processor calculates the second bandwidth according to rates of data respectively transmitted to the destination communication devices.

10. The communication system according to claim 4, wherein the second processor decreases the second bandwidth and increases bandwidths to be respectively allocated to the other destination communication devices that receive data from the second communication device when a rate of data transmitted from the second communication device to the first communication device decreases.

11. The communication system according to claim 4, wherein when an upper limit rate with respect to data transmitted from the second communication device to the first communication device is specified in advance, the first processor calculates the first bandwidth according to a smaller one of values of a bandwidth obtained by dividing a reception bandwidth of the first communication device by the number of the source communication devices and a bandwidth corresponding to the upper limit rate.

12. The communication system according to claim 4, wherein when an upper limit rate with respect to data transmitted from the second communication device to the first communication device is specified in advance, the second processor determines a provisional upper limit rate according to a smaller one of values of the first bandwidth and the second bandwidth, and outputs a smaller one of values of the provisional upper limit rate and the upper limit rate as the upper limit transmission rate.

13. The communication system according to claim 4, wherein when a lower limit rate with respect to data transmitted from the second communication device to the first communication device is specified in advance, the first processor calculates the first bandwidth according to a greater one of values of a bandwidth obtained by dividing a reception bandwidth of the first communication device by the number of the source communication devices and a bandwidth corresponding to the lower limit rate.

14. The communication system according to claim 4, wherein when a lower limit rate with respect to data transmitted from the second communication device to the first communication device is specified in advance, the second processor calculates the second bandwidth according to a greater one of values of a bandwidth obtained by dividing a transmission bandwidth of the second communication device by the number of the destination communication devices and a bandwidth corresponding to the lower limit rate.

15. A communication rate control method used in a communication system that includes a first communication device and a second communication device that transmits data to the first communication device, wherein the first communication device calculates a first bandwidth that indicates a bandwidth to be allocated to a data transmission conducted from the second communication device to the first communication device according to information relating to one or more source communication devices including the second communication device, and notifies the second communication device of the calculated first bandwidth, the second communication device calculates a second bandwidth that indicates a bandwidth to be allocated to a data transmission conducted from the second communication device to the first communication device according to information relating to one or more destination communication devices including the first communication device, and transmits data to the first communication device at a rate that does not exceed an upper limit transmission rate, the upper limit transmission rate being determined according to a smaller one of values of the first bandwidth and the second bandwidth, the first communication device obtains the first bandwidth by dividing a reception bandwidth of the first communication device by the number of the source communication devices, the second communication device obtains the second bandwidth by dividing a transmission bandwidth of the second communication device by the number of the destination communication devices, and when the first communication device detects that the second communication device has stopped the data transmission to the first communication device, the first communication device decreases the first bandwidth to a specified minimum amount, the specified minimum amount not being zero, and the first communication device notifies the second communication device of the decreased first bandwidth.

\* \* \* \* \*